United States Patent
Ryudo et al.

(10) Patent No.: US 11,285,564 B2
(45) Date of Patent: Mar. 29, 2022

(54) LASER PROCESSING HEAD AND LASER PROCESSING DEVICE USING SAME

(71) Applicant: Panasonic Intellectual Property Management Co., Ltd., Osaka (JP)

(72) Inventors: Makoto Ryudo, Hyogo (JP); Doukei Nagayasu, Hyogo (JP); Hitoshi Nishimura, Osaka (JP); Jingbo Wang, Hyogo (JP); Masatoshi Nishio, Osaka (JP); Hideaki Yamaguchi, Osaka (JP); Yoshiaki Takenaka, Osaka (JP); Kiyotaka Eizumi, Osaka (JP); Ryo Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 16/476,075

(22) PCT Filed: Nov. 20, 2017

(86) PCT No.: PCT/JP2017/041588
§ 371 (c)(1),
(2) Date: Jul. 3, 2019

(87) PCT Pub. No.: WO2018/139019
PCT Pub. Date: Aug. 2, 2018

(65) Prior Publication Data
US 2019/0351507 A1    Nov. 21, 2019

(30) Foreign Application Priority Data
Jan. 25, 2017  (JP) .............................. JP2017-011457

(51) Int. Cl.
*B23K 26/08*    (2014.01)
*B23K 26/06*    (2014.01)

(52) U.S. Cl.
CPC .......... *B23K 26/08* (2013.01); *B23K 26/0643* (2013.01)

(58) Field of Classification Search
CPC ..... B23K 26/08; B23K 26/00; B23K 26/0643
See application file for complete search history.

(56) References Cited

U.S. PATENT DOCUMENTS

| 5,657,539 A | * | 8/1997 | Orikasa | ................. | B23K 26/08 |
| | | | | | 219/121.71 |
| 6,120,976 A | * | 9/2000 | Treadwell | ............. | B23K 26/06 |
| | | | | | 219/121.8 |

(Continued)

FOREIGN PATENT DOCUMENTS

| JP | 62-207594 | 9/1987 |
| JP | 1-186296 | 7/1989 |

(Continued)

OTHER PUBLICATIONS

International Search Report of PCT application No. PCT/JP2017/041588 dated Dec. 19, 2017.

*Primary Examiner* — Dana Ross
*Assistant Examiner* — Kuangyue Chen
(74) *Attorney, Agent, or Firm* — Wenderoth, Lind & Ponack L.L.P.

(57) ABSTRACT

A laser processing head includes parallel plate (17) that shifts an optical axis of a laser beam to be emitted from a top to a bottom of body case (6) from a first optical axis to a second optical axis, parallel plate (19) that shift the optical axis of the laser beam from the second optical axis to a third optical axis, and body case (6) that accommodates holders (7 and 18) that respectively hold parallel plates (17 and 19). The laser processing head further includes a rotation mechanism that rotates holders (7 and 18) around a first rotary axis. Opening (7a) that a laser beam reflected by an incident surface of second parallel plate (19) passes through is (Continued)

formed in holder (7), and light receiving part (6a) that receives the laser beam having passed through opening (7a) is disposed in body case (6).

10 Claims, 18 Drawing Sheets

(56) References Cited

U.S. PATENT DOCUMENTS

| | | | |
|---|---|---|---|
| 2003/0052105 A1* | 3/2003 | Nagano .............. | B23K 26/0604 |
| | | | 219/121.83 |
| 2015/0076125 A1* | 3/2015 | Toyosawa .............. | B23K 26/00 |
| | | | 219/121.73 |
| 2016/0008920 A1* | 1/2016 | Goya .................... | B23K 26/082 |
| | | | 219/121.61 |
| 2017/0050267 A1* | 2/2017 | Kung .................... | B23K 26/703 |
| 2018/0161922 A1* | 6/2018 | Kung ..................... | B23K 26/08 |

FOREIGN PATENT DOCUMENTS

| | | |
|---|---|---|
| JP | 10-193146 | 7/1998 |
| WO | 2015/129249 | 9/2015 |

* cited by examiner

LASER PROCESSING HEAD AND LASER PROCESSING DEVICE USING SAME

CROSS-REFERENCE TO RELATED APPLICATIONS

This application is a U.S. national stage application of the PCT International Application No. PCT/JP2017/041588 filed on Nov. 20, 2017, which claims the benefit of foreign priority of Japanese patent application No. 2017-011457 filed on Jan. 25, 2017, the contents all of which are incorporated herein by reference.

TECHNICAL FIELD

The present disclosure relates to a laser processing head and a laser processing device using the laser processing head.

BACKGROUND ART

In recent years, a processing method called remote laser processing has attracted attention. In this processing method, a processing point is irradiated with a laser beam having a long focal length from a position away from the processing point to perform laser welding.

In particular, a compact and light-weight laser processing head has increased its attention. For example, PTL 1 discloses a laser processing head that shifts a laser beam with a simple configuration to control an irradiation position of the laser beam onto a workpiece, thus performing laser processing such as spot welding and seam welding.

CITATION LIST

Patent Literature

PTL 1: WO 2015/129249

SUMMARY OF THE INVENTION

The laser processing head disclosed in PTL 1 achieves a more compact and light-weight head as compared to a conventional configuration of controlling a position of a laser beam using a galvanometer mirror.

The laser processing head rotates two parallel plates that are arranged in the head to be parallel to each other by individual rotation mechanisms and shifts an optical axis of a laser beam passing through each parallel plate to control the position of the laser beam.

Consequently, a state of optical components and the rotation mechanisms disposed in the head greatly influences performance of the head, and thus there is a need for a technique to diagnose such state.

The present disclosure has been achieved in view of the above problems, and an object of the invention is to provide a laser processing head in which a state of head components is diagnosed with a simple configuration.

To achieve the above object, according to an aspect of the present disclosure, a light receiving part that receives a laser beam reflected by an upper surface of a bottom parallel plate of two parallel plates is disposed in the head, and a position of the light receiving part is adjusted according to a shift amount of an optical axis of the laser beam. In addition, a state of components of the head is diagnosed based on a signal output from the light receiving part.

Specifically, a laser processing head according to an aspect of the present disclosure includes a first parallel plate that shifts an optical axis of a laser beam from a first optical axis to a second optical axis, a first holder that holds the first parallel plate, a first rotation mechanism that rotates the first holder around a first rotary axis, a second parallel plate that shifts the optical axis of the laser beam that has been shifted to the second optical axis by the first parallel plate to a third optical axis, a second holder that holds the second parallel plate, a second rotation mechanism that rotates the second holder around a second rotary axis, and a first case that accommodates the first parallel plate, the first holder, the second parallel plate, and the second holder. The first rotary axis, the second rotary axis, and the first optical axis are aligned with each other. The laser beam passes through the first case from upward to downward. A first light transmission part that the laser beam having been shifted by the first parallel plate and reflected by an incident surface of the second parallel plate passes through is formed in the second holder. A first light receiving part that receives the laser beam having passed through the first light transmission part is disposed in the first case.

This configuration enables the laser beam reflected by the incident surface of a laser beam on the second parallel plate to be received by the first light receiving part. It is thus possible to recognize a laser beam output state.

The first case preferably includes an intersection part P2 where a plane x1 that passes an intersection point P of an incident surface of the laser beam on the second parallel plate to the first rotary axis and extends in a direction orthogonal to the first rotary axis intersects a side surface of the first case, and the first light receiving part is preferably disposed at a position that is shifted upward or downward from the intersection part P2 of the first case by a shift amount A between the first optical axis and the second optical axis according to rotation of the first parallel plate.

This configuration enables the laser beam reflected by the incident surface of a laser beam on the second parallel plate to be reliably received by the first light receiving part.

A center of the first light receiving part is preferably placed at a position that is shifted upward or downward from the intersection part P2 by the shift amount A.

This configuration enables an amount of light received by the first light receiving part to be maximized. It is thus possible to accurately recognize the laser beam output state.

Preferably, the laser processing head further includes a second case that is disposed at an end portion of the first case on a laser beam emission side, a third holder that is detachably attached to the second case, and a first protection member that is held by the third holder and is capable of transmitting the laser beam whose optical axis has been shifted to the third optical axis. The third holder preferably includes a second light transmission part at a predetermined position opposing a side surface of the first protection member. The second case preferably includes a second light receiving part that receives a laser beam having traveled through the first protection member at a position opposing the second light transmission part.

This configuration enables an output of a laser beam that is reflected by the first protection member and returns to the head to be detected by the second light receiving part. It is thus possible to recognize a state of the first protection member, in particular, the degree of contamination on a surface.

One or both of the first light transmission part and the second light transmission part are preferably closed by a light transmission member that transmits the laser beam.

This configuration enables a laser beam that passes through one or both of the first light transmission part and the second light transmission part to be directed to one or both of the first light receiving part and the second light receiving part. Moreover, it is possible to prevent dust and fine particles from entering the head.

Preferably, the first light receiving part and the second light receiving part are respectively disposed in the first case and the second case on a side where the first rotation mechanism and the second rotation mechanism are disposed.

This configuration enables wires connected to the first light receiving part and the second light receiving part to be arranged together with wires connected to the first rotation mechanism and the second rotation mechanism. Wiring is thus simplified and a compact laser processing head is achieved.

A laser processing device according to an aspect of the present disclosure includes a laser oscillator that emits a laser beam having the first optical axis, the laser processing head described above that emits the laser beam to a workpiece, and a control device that controls laser oscillation of the laser oscillator and a movement of the laser processing head.

This configuration enables an output state of a laser beam emitted from the laser processing head to be recognized. It is thus avoid a processing defect and other defects.

Preferably, the control device at least includes a controller that transmits an output command signal to the laser oscillator to cause the laser oscillator to oscillate laser, a storage unit that stores the output command signal and a light receiving signal output from the first light receiving part, a determination unit that determines whether a laser beam output is normal, based on the output command signal and the light receiving signal, and a display unit that displays a result determined by the determination unit.

With this configuration, it is possible to simply determine whether there is an abnormality in the laser processing device, based on a light output of a laser beam to be actually emitted and a set value.

The controller is preferably configured to transmit a rotation command signal to the first rotation mechanism or the second rotation mechanism to rotate the first holder or the second holder at a predetermined rotation speed. The storage unit is preferably configured to store the rotation command signal. The determination unit is preferably configured to determine whether the first rotation mechanism or the second rotation mechanism operates normally, based on a rotation period included in the rotation command signal and a variation period of a light receiving signal output from the first light receiving part.

With this configuration, it is possible to simply determine whether there is an abnormality in the first rotation mechanism or the second rotation mechanism disposed in the laser processing head, based on the variation period of the light receiving signal output from the first light receiving part and a set rotation period.

The determination unit is preferably configured to determine a replacement period of the first protection member, based on a light receiving signal output from the second light receiving part.

With this configuration, it is possible to simply determine the replacement period of the protection member disposed in the laser processing head, based on the light receiving signal output from the second light receiving part.

According to an aspect of the present disclosure, it is possible to simply diagnose the state of the components of the laser processing head and thus to avoid a processing defect and other defects.

DESCRIPTION OF EMBODIMENTS

Hereinafter, exemplary embodiments of the present disclosure will be described with reference to the drawings. The following description of preferred exemplary embodiments is merely illustrative in nature and is not intended to limit the present disclosure, application, or uses.

In the following description, the word "align" means not only strict align but also align reflecting assembly tolerances and processing tolerances in manufacturing. In addition, the word "orthogonal" means not only strict orthogonal but also orthogonal reflecting assembly tolerances and processing tolerances in manufacturing.

First Exemplary Embodiment (Configurations of Laser Processing Device and Laser Processing Head)

Figure 1:
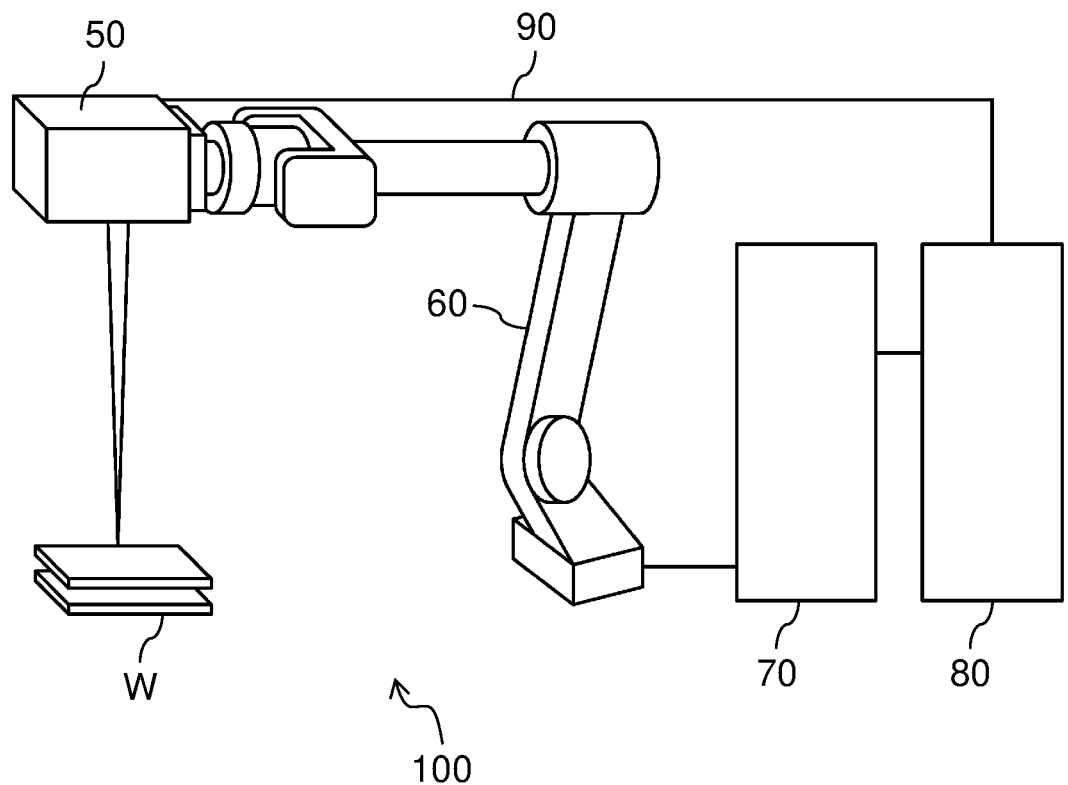
FIG. 1 illustrates a configuration of a laser processing device according to a first exemplary embodiment of the present disclosure.

FIG. 1 illustrates a configuration of laser processing device 100 according to the present exemplary embodiment. Laser processing device 100 includes laser processing head 50, manipulator 60, robot control device 70, laser oscillator 80, and optical fiber 90.

Laser processing head 50 irradiates a laser beam from optical fiber 90 onto workpiece W. Manipulator 60 moves laser processing head 50 that is attached to a distal end of manipulator 60. Robot control device 70 controls movements of both laser processing head 50 and manipulator 60, and laser oscillation of laser oscillator 80. Laser oscillator 80 oscillates a laser beam to be output to optical fiber 90. Optical fiber 90 transmits a laser beam output from laser oscillator 80 to laser processing head 50. Such a configuration enables laser processing device 100 to output a laser beam, which is output from laser oscillator 80, from laser processing head 50. Laser processing device 100 moves laser processing head 50 and manipulator 60 for the purpose of irradiating a laser beam onto workpiece W along a desired trace.

Laser processing device 100 is used to perform processing such as cutting, welding, and drilling on workpiece W.

Figure 2:
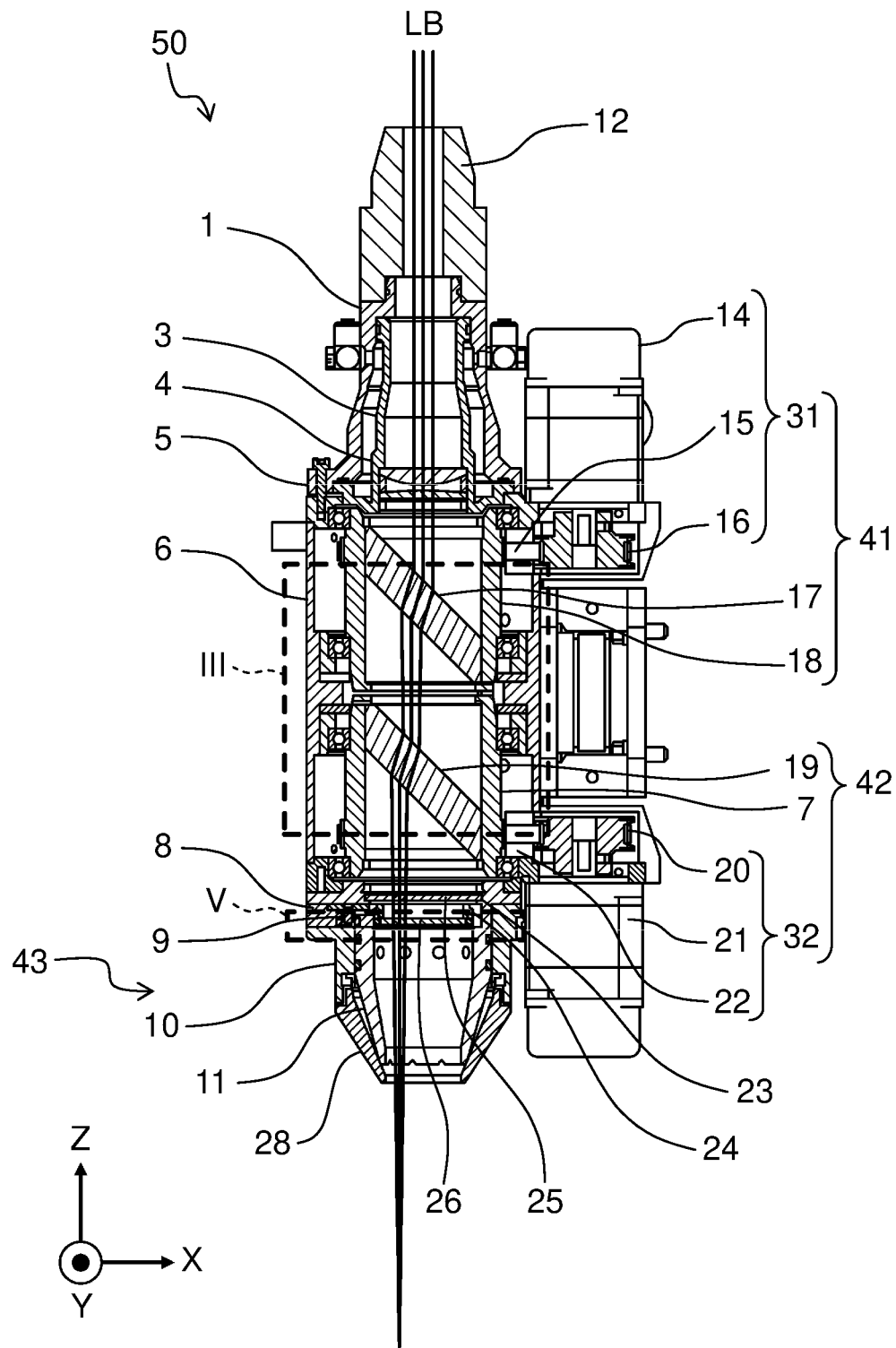
FIG. 2 illustrates a configuration of a laser processing head.

FIG. 2 illustrates a configuration of laser processing head 50 according to the present exemplary embodiment. Laser processing head 50 includes connector 12, lens body 1, body case 6 (first case), shield holder 8, nozzle unit 43 (second case), and servomotors 14 and 21. Shield holder 8 is detachably attached to nozzle unit 43. In other configurations, a plurality of components may be integrated.

Laser processing head 50 includes connector 12 and is connected via connector 12 to optical fiber 90. Laser beam LB emits from an emission end surface of optical fiber 90 to laser processing head 50 while expanding at a fixed angle.

Lens body 1 holds lens holder 3 to which collimation lens 4 and focusing lens 5 are fixed. Collimation lens 4 collimates laser beam LB emit from the emission end surface of optical fiber 90. The laser beam collimated by collimation lens 4 is collected to be focused on a processing point on workpiece W by focusing lens 5.

Lens body 1 and lens holder 3 determine optical positional relationships between the emission end surface of optical fiber 90, collimation lens 4, and focusing lens 5.

Rotation mechanism 31 (first rotation mechanism), parallel plate 17 (first parallel plate), and holder 18 (first holder) are disposed in body case 6. Optical unit 41 (first optical unit) is constituted by rotation mechanism 31, parallel plate 17, and holder 18. Rotation mechanism 31 is constituted by servomotor 14 (first driver), timing belt 15 (first transmission member), and timing belt pulley 16 (first rotating member). Parallel plate 17 is fixed in holder 18 having a cylindrical shape, both ends of which are held by bearings. Timing belt 15 is disposed on an outer circumferential surface of holder 18. Holder 18 is rotated by servomotor 14 with timing belt 15 interposed between holder 18 and servomotor 14. Specifically, holder 18 rotates around a first rotary axis. The first rotary axis extends in the same direction as an optical axis direction of a laser beam to be output from laser processing head 50.

In FIG. 2, the first rotary axis direction is a Z-axis direction, and directions orthogonal to the Z-axis direction are an X-axis direction and a Y-axis direction, respectively. In the following description, similar expressions may be used. In addition, a plus direction of the Z-axis may be referred to as "upward", whereas a minus direction of the Z-axis may be referred to as "downward".

Rotation mechanism 32 (second rotation mechanism), parallel plate 19 (second parallel plate), and holder 7 (second holder) are also disposed in body case 6. Optical unit 42 (second optical unit) is constituted by rotation mechanism 32, parallel plate 19, and holder 7. Rotation mechanism 32 is constituted by servomotor 21 (second driver), timing belt 22 (second transmission member), and timing belt pulley 20 (second rotating member). Parallel plate 19 is fixed in holder 7 having a cylindrical shape, both ends of which are held by bearings. Timing belt 22 is disposed on an outer circumferential surface of holder 7. Holder 7 is rotated by servomotor 21 with timing belt 22 interposed between holder 7 and servomotor 21. Specifically, holder 7 rotates around a second rotary axis. The second rotary axis extends in the same direction as the optical axis direction of a laser beam to be output from laser processing head 50 and as the Z-axis direction.

The first rotary axis direction of optical unit 41 and the second rotary axis direction of optical unit 42 are the same. In addition, optical unit 41 and optical unit 42 are arranged in body case 6 to be symmetrical. That is, optical unit 41 and optical unit 42 are arranged to be symmetrical to each other with respect to a plane vertical to the first rotary axis and the second rotary axis. In FIG. 2, first optical unit 41 and second optical unit 42 are arranged symmetrically in a vertical direction. In such an arrangement, when servomotor 14 and servomotor 21 rotate in the same direction, a rotation direction of parallel plate 17 is opposite to a rotation direction of parallel plate 19. By reversing a rotation direction of servomotor 14 that drives parallel plate 17, parallel plate 17 and parallel plate 19 rotate in the same direction.

To downsize laser processing head 50 and increase an irradiation range of laser processing head 50, it is desirable to arrange optical unit 41 and optical unit 42 so that the first rotary axis is aligned with the second rotary axis. The first rotary axis direction and the second rotary axis direction are preferably the same as the optical axis direction of laser beam LB from optical fiber 90. Moreover, the first rotary axis and the second rotary axis are preferably aligned with the optical axis of laser beam LB from optical fiber 90.

In the following description, the first rotary axis and the second rotary axis are aligned with the optical axis of laser beam LB from optical fiber 90, and the optical axis of laser beam LB is aligned with the optical axis (hereinafter, "first optical axis") of a laser beam to enter parallel plate 17, unless otherwise specified.

The first and second rotary axes are also a center axis of laser processing head 50 in the Z-axis direction.

Figure 3:
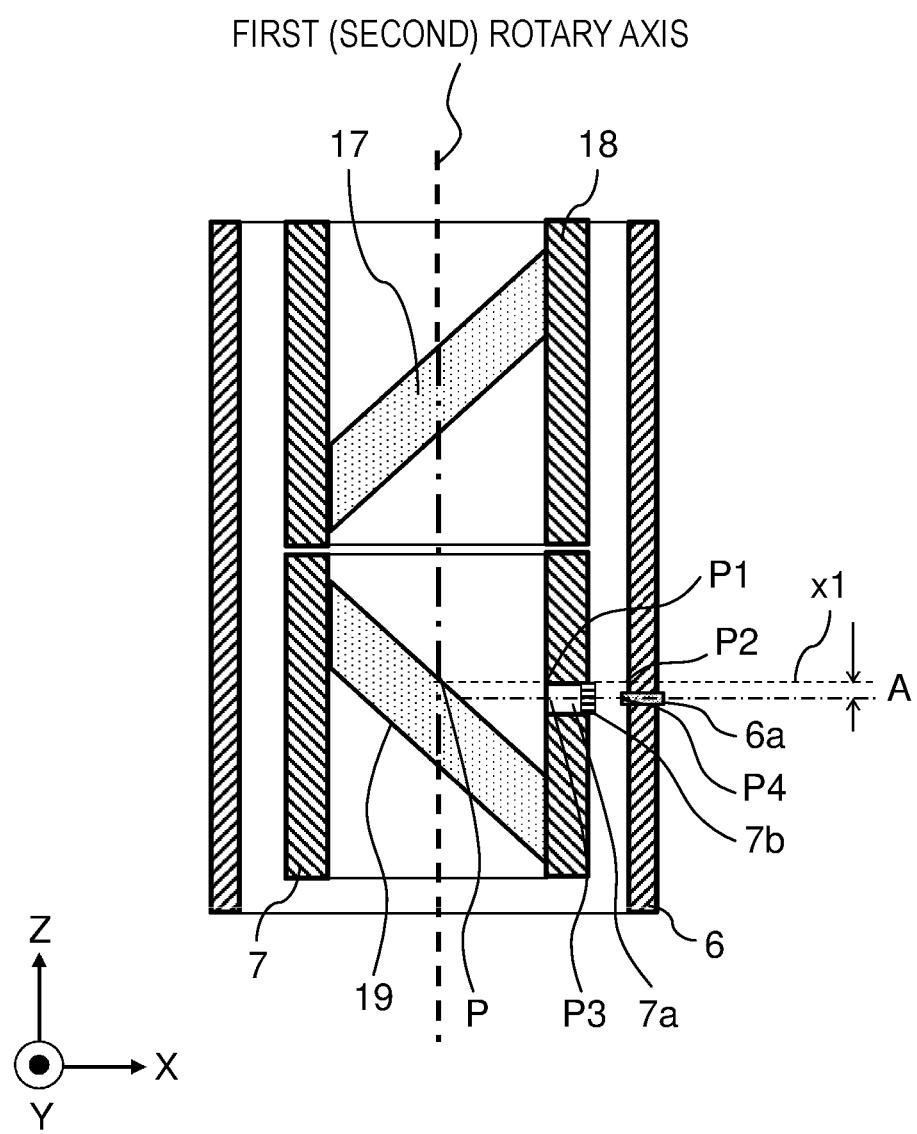
FIG. 3 is a schematic cross-sectional view of region III illustrated in FIG. 2.

FIG. 3 is a schematic cross-sectional view of region III illustrated in FIG. 2. Opening 7a (first light transmission part) is formed in a side surface of holder 7. Opening 7a is closed by light transmission member 7b that transmits a laser beam. Light receiving part 6a is disposed in a side surface of body case 6.

Light transmission member 7b also functions to prevent dust and fine particles from entering holder 7 from the surrounding environment. Light receiving part 6a is a photoelectric conversion device such as a photodiode.

Although not illustrated in the drawings, opening 7a is a circular window with a diameter of 1 mm to 20 mm.

Opening 7a is formed in the side surface of holder 7 so that a laser beam reflected on an upper surface of parallel plate 19 passes through opening 7a to be irradiated outside holder 7. Light receiving part 6a is disposed in the side surface of body case 6 so as to receive a laser beam having passed through opening 7a.

Assuming that the first rotary axis is orthogonal to imaginary plane x1 that extends in the X-axis direction from point P at which the first rotary axis intersects with the upper surface of parallel plate 19, the side surface of holder 7 intersects imaginary plane x1 at intersection part P1 and the side surface of body case 6 intersects imaginary plane x1 at intersection part P2.

In FIG. 3, intersection parts P1 and P2 are indicated as intersection points. However, actual intersection parts P1 and P2 are circles in which imaginary plane x1 intersects the respective inner side surfaces of holder 7 and body case 6.

As illustrated in FIG. 3, opening 7a is disposed at position P3 on the side surface of holder 7, which is shifted from intersection part P1 in the minus direction of the Z axis by distance A. Light receiving part 6a is disposed at position P4 on the side surface of body case 6, which is shifted from intersection part P2 in the minus direction of the Z axis by distance A. These positions will be described in detail later.

A cover glass having an AR (Anti-Reflection) coating applied on a surface is used as light transmission member 7b. If a light transmission member that disperses or collects a laser beam to average a laser beam transmitting through the light transmission member, such as a diffusion plate and a collecting lens, is used, almost all laser beams passing through opening 7a are directed to light receiving part 6a and thus are reliably received by light receiving part 6a.

Next, a configuration of a distal end of laser processing head 50 will be described.

As illustrated in FIG. 2, nozzle unit 43 is connected to the vicinity of a distal end of body case 6. Protection glass 25 (second protection member) is fixed on nozzle unit 43. In nozzle unit 43, inner nozzle 11 and outer nozzle 28 are disposed in nozzle holder 10. The distal end of body case 6 means an end of body case 6 on a laser beam emission side. Shield holder 8 including protection glass 26 (first protection member) is accommodated in nozzle unit 43 on a side closer to the distal end of nozzle unit 43 than protection glass 25. Shield holder 8 is detachably attached to nozzle unit 43, and thus protection glass 26 is detachably attached to nozzle unit 43.

Protection glass 25 is fixed to laser processing head 50 (specifically, nozzle unit 43) by a screw ring (not illustrated).

Figure 4:
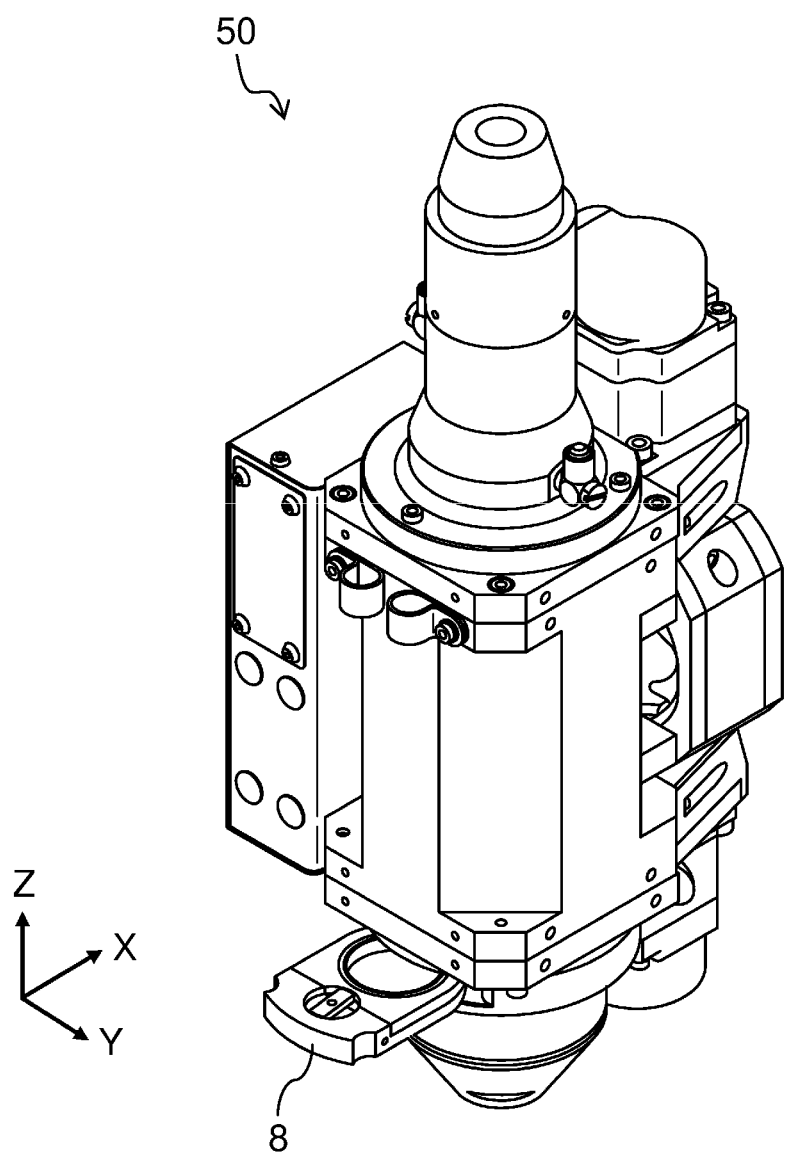
FIG. 4 illustrates the laser processing head with a shield holder removed.

FIG. 4 is a view of laser processing head 50 with shield holder 8 removed. In view of maintenance, protection glass 26 is disposed in shield holder 8 that slides in a direction orthogonal to the optical axis direction of a laser beam (the X-axis direction in the present exemplary embodiment) and is detachably attached to laser processing head 50. Protection glass 26 is removed from laser processing head 50 when shield holder 8 is removed from laser processing head 50. Protection glass 26 is disposed in laser processing head 50 when shield holder 8 is attached to laser processing head 50.

Configurations of shield holder 8 and a surrounding part will be described with reference to FIGS. 5 and 6.

Figure 5:
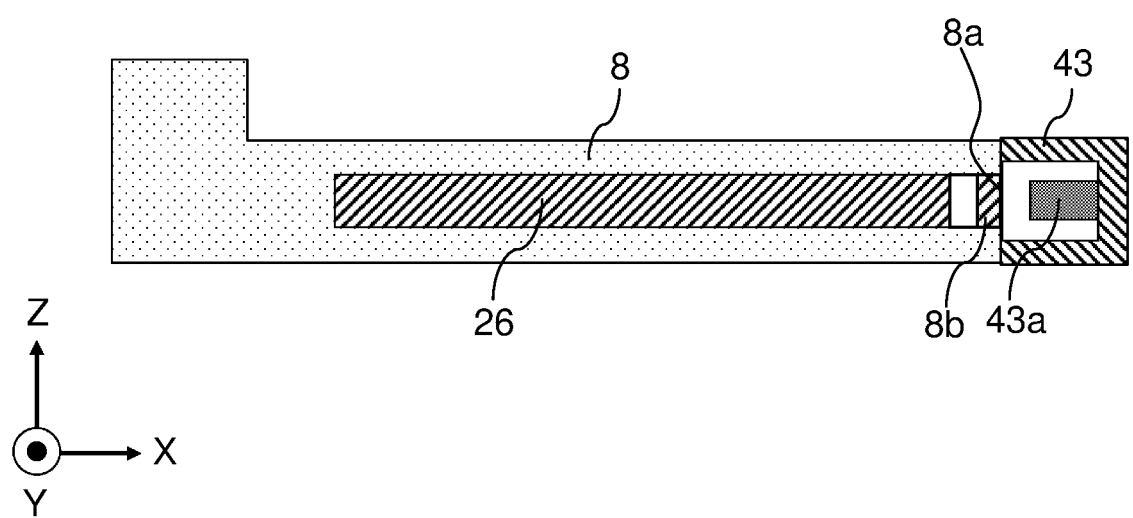
FIG. 5 is a schematic cross-sectional view of region V illustrated in FIG. 2.

FIG. 5 is a schematic cross-sectional view of region V illustrated in FIG. 2. Opening 8a (second light transmission part) is formed in a side portion of shield holder 8. Light receiving part 43a (second light receiving part) is disposed in nozzle unit 43 so as to oppose opening 8a.

Like light receiving part 6a, light receiving part 43a is a photoelectric conversion device such as a photodiode.

Like opening 7a illustrated in FIG. 3, opening 8a is closed by light transmission member 8b. Light transmission member 8b enables light to pass from opening 8a outside shield holder 8 and prevents dust and fine particles from the surrounding environment from adhering to protection glass 26 and other components.

Although not illustrated in the drawings, opening 8a is a slit with a length of a few mm to 10 mm.

Figure 6:
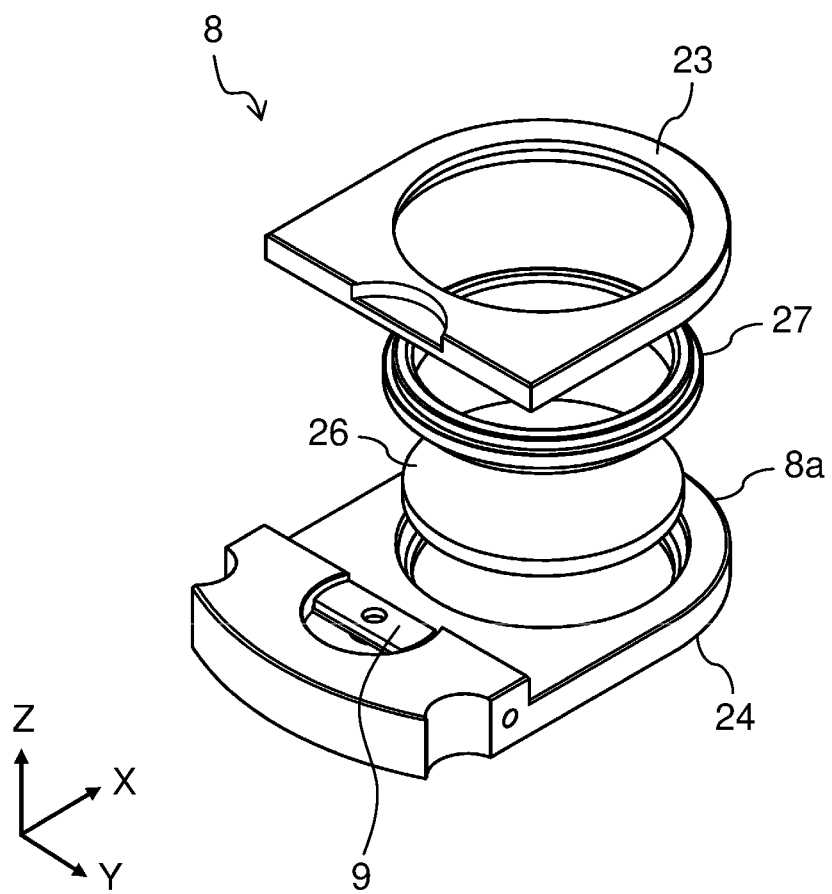
FIG. 6 is an exploded perspective view of the shield holder having a protection glass.

FIG. 6 is an exploded perspective view of shield holder 8 including protection glass 26. Shield holder 8 is constituted by two split members, that is, first member 23 and second member 24. Protection glass 26 is sandwiched between first member 23 and second member 24. First member 23 and second member 24 are easily coupled to or separated from each other by operating fixing lever 9. Protection glass 26 is circumferentially held in shield holder 8 with elastic deformation force of O-ring 27. In addition, protection glass 26 is axially held by being sandwiched between first member 23 and second member 24. By operating lever 9, first member 23 is easily separated from second member 24. Protection glass 26 can thus be easily replaced without using any tools.

Protection glass 25 may be eliminated, and only protection glass 26 that is detachably attached to laser processing head 50 may be provided.

(Configuration of Functional Blocks of Laser Processing Device)

Figure 7:
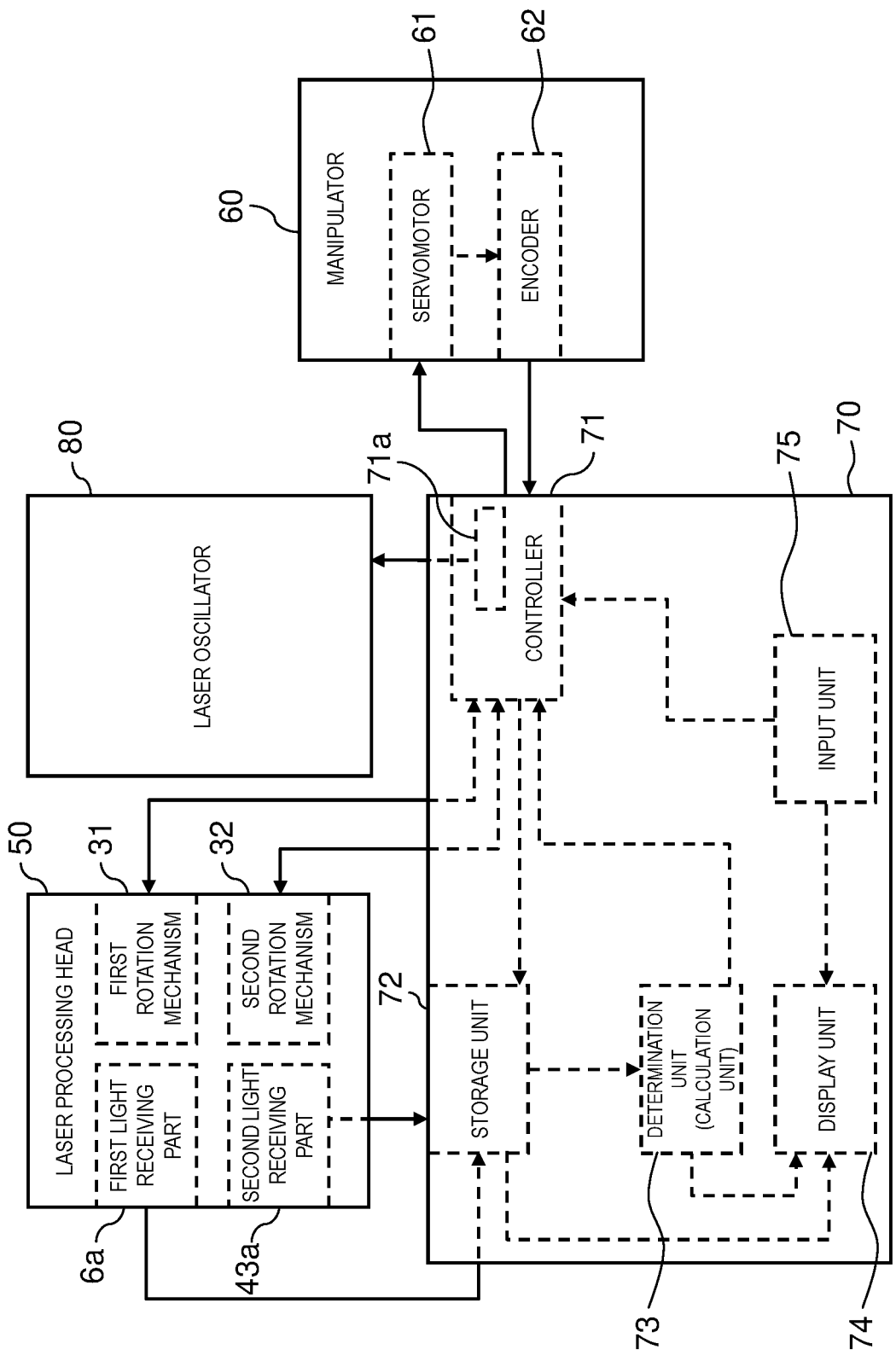
FIG. 7 illustrates a configuration of functional blocks of the laser processing device.

FIG. 7 illustrates a configuration of functional blocks of laser processing device 100 according to the present exemplary embodiment. As described above, laser processing head 50 includes light receiving parts 6a and 43a and rotation mechanisms 31 and 32. Manipulator 60 includes servomotor 61 and encoder 62 for each joint axis. Robot control device 70 includes controller 71, storage unit 72, determination unit 73, display unit 74, and input unit 75.

Controller 71 includes light output controller 71a. Light output controller 71a is configured to transmit an output command to a power supply unit (not illustrated) according to a control program input from input unit 75 and to control a laser beam output of laser oscillator 80.

Controller 71 is also configured to generate a rotation command according to the control program input from input unit 75 and feedback signals from respective encoders (not illustrated) in rotation mechanisms 31 and 32, transmit the rotation command to servomotors 14 and 21 (see FIG. 2) respectively disposed in rotation mechanisms 31 and 32, and control a rotation speed and a rotation amount of servomotors 14 and 21.

In addition, controller 71 is configured to generate a position command according to the control program input from input unit 75 and a feedback signal from encoder 62 in manipulator 60 and transmit the position command to servomotor 61 in manipulator 60, thus controlling the rotation speed and rotation amount of servomotor 61.

Storage unit 72 is configured to receive light receiving signals from light receiving parts 6a and 43a and store values of these signals.

Determination unit 73 is configured to determine whether laser oscillator 80 normally outputs a laser beam or whether rotation mechanisms and 32 normally operate based on the light receiving signals. Determination unit 73 is also a calculation unit that performs a calculation process required for control in controller 71 using information directly input from input unit 75 or information input from input unit 75 or other units and stored in storage unit 72. In addition, determination unit 73 is configured to display charts in an appropriate format, which are obtained by processing various information, on display unit 74.

Display unit 74 is configured to display results determined by determination unit 73, an output state of laser oscillator 80, a movement state of manipulator 60, and other states.

Input unit 75 is configured to allow inputs of a control program for determining an output of laser oscillator 80 and a movement speed and a movement amount of manipulator 60 and numerical values. Input unit 75 is also configured to allow inputs of a control program for determining a rotation speed and a rotation time of servomotors 14 and 21 and numerical values.

FIG. 7 illustrates the main functional blocks for various diagnoses in laser processing head 50 to be described later, and a description of other functions is omitted. For example, a safety stop function block and other blocks are omitted.

Configurations of the respective devices, connection relationships between the devices, and a flow of signals in robot control device 70 are appropriately determined based on the specifications of laser processing device 100 and robot control device 70, and thus are not limited to the present exemplary embodiment.

(Arrangement of First Opening and First Light Receiving Part)

Figure 8A:
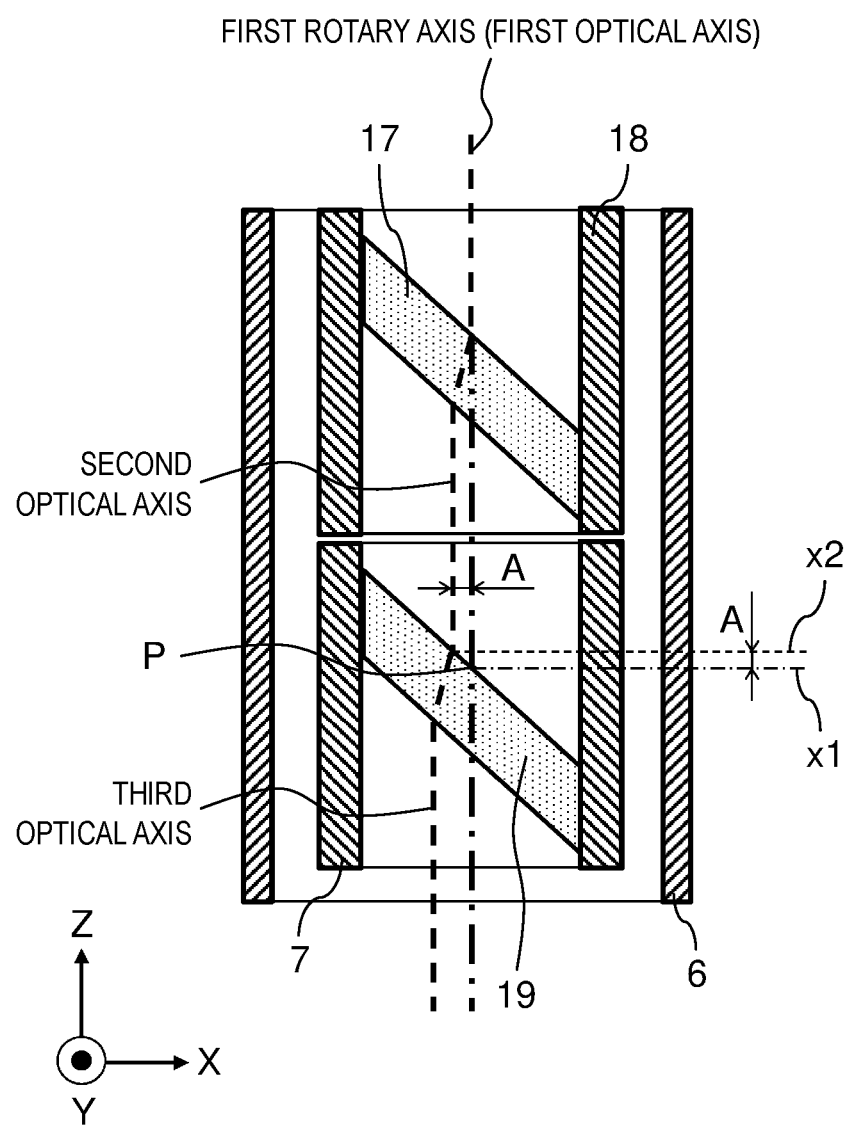
FIG. 8A illustrates a change in an optical path of a laser beam in the laser processing head according to rotation of parallel plates in a case where the two parallel plates are parallel to each other.
Figure 8B:
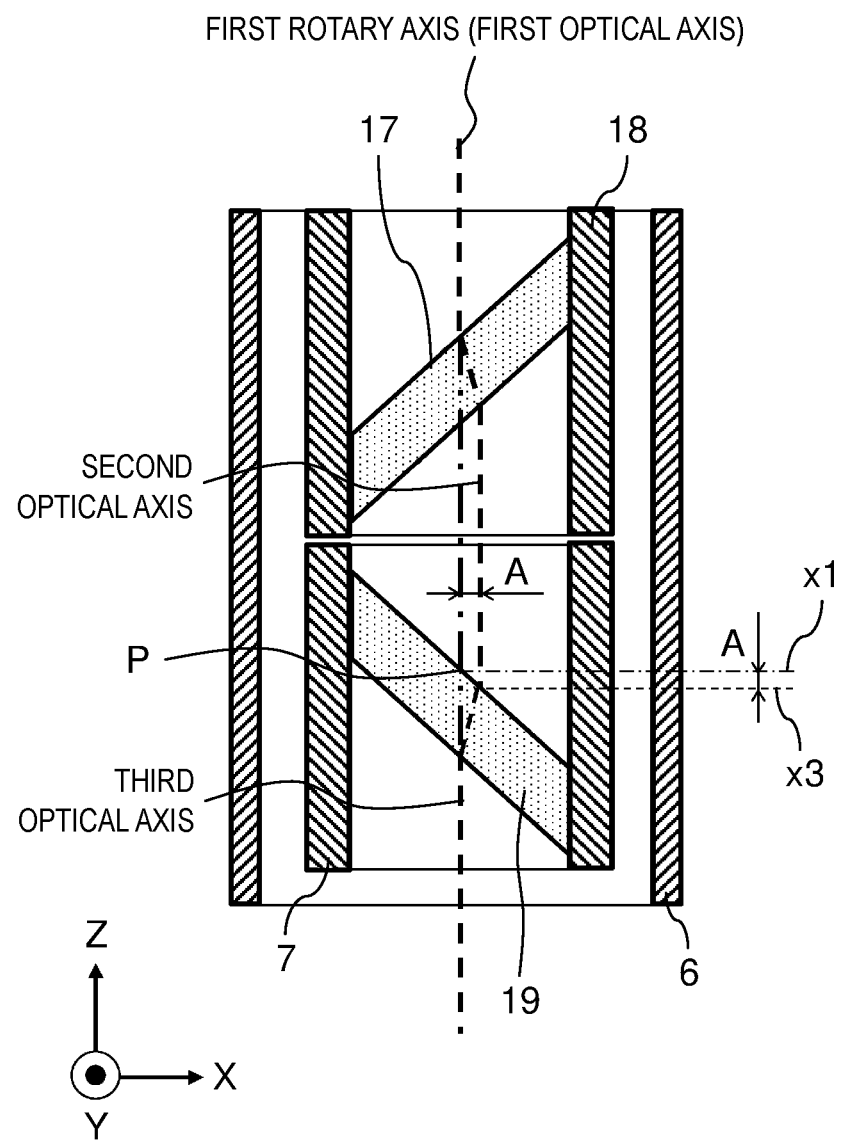
FIG. 8B illustrates a change in the optical path of a laser beam in the laser processing head according to the rotation of parallel plates in a case where the two parallel plates forms an angle of 90°.

FIGS. 8A and 8B illustrate a change in an optical path of a laser beam within laser processing head 50 according to rotation of parallel plates 17 and 19. A laser beam passes through laser processing head 50 including body case 6 from upward to downward while the optical axis is shifted by parallel plates 17 and 19, and is emitted to workpiece W.

Specifically, a laser beam having passed through focusing lens 5 is refracted twice (when entering parallel plate 17 and when emitted from parallel plate 17) when passing through parallel plate 17. The laser beam thus shifts in parallel by an amount determined by a thickness of parallel plate 17, a tilt angle of parallel plate 17 with respect to the first rotary axis, which is an angle of parallel plate 17 attached to the first rotary axis, and a refractive index of parallel plate 17. That is, the optical axis (first optical axis) of a laser beam entering parallel plate 17 and the optical axis (second optical axis) of a laser beam emitted from parallel plate 17 extend in the same direction but are shifted from each other. The same holds true for parallel plate 19 that has a similar configuration to parallel plate 17. That is, the optical axis (second optical axis) of a laser beam entering parallel plate 19 and the optical axis (third optical axis) of a laser beam emitted from parallel plate 19 extend in the same direction but are shifted from each other. Parallel plate 17 and parallel plate 19 according to the present exemplary embodiment are made of synthetic quartz of which thickness t is 13 mm, tilt angle with respect to the first rotary axis (or the second rotary axis) is 45°, and refractive index is 1.44963. In this case, the optical axis (or the second optical axis) of a laser beam having passed through parallel plate 17 is shifted by A (=4.1 mm). Similarly, when a laser beam passes through parallel plate 19, the optical axis (third optical axis) of the laser beam is shifted by A (=4.1 mm). Consequently, a working range of a laser beam according to the present exemplary embodiment is in a circle with a radius of 8.2 mm.

The thickness and refraction index of parallel plates 17 and 19 may be appropriately changed depending on an oscillation wavelength of laser oscillator 80 and processing conditions required, and other factors. In such a case, the working range of a laser beam may also be changed.

As illustrated in FIG. 8A, when parallel plate 17 is parallel to parallel plate 19, if a laser beam having passed through parallel plate 17 is reflected by parallel plate 19, the optical axis of a reflected light beam is orthogonal to the second optical axis, because parallel plate 19 is tilted to the second optical axis by 45°. In this case, the reflected light beam is reflected in the plus direction of the X-axis. The reflectance of a laser beam on an upper surface of parallel plate 19 is set to be less than or equal to 0.1%.

Before a laser beam passes through parallel plate 17, the optical axis of the laser beam is the first optical axis. After the laser beam passes through parallel plate 17, the optical axis is shifted to the second optical axis. Consequently, the optical axis of a laser beam entering the upper surface of parallel plate 19 is shifted from intersection point P of the first optical axis (first rotary axis) and the upper surface of parallel plate 19 in the minus direction of the X-axis by shift amount A (=4.1 mm) of the second optical axis relative to the first optical axis.

With such shift, the optical axis of a reflected light beam that is actually reflected on the upper surface of parallel plate 19 is straight line x2 that is shifted from imaginary plane x1 that is extended through intersection point P in the plus direction of the X-axis by 4.1 mm in the plus direction of the Z-axis.

As illustrated in FIG. 8B, when parallel plate 17 forms an angle of 90° with parallel plate 19, if a laser beam having passed through parallel plate 17 is reflected by parallel plate 19, the optical axis of a reflected light beam is also orthogonal to the second optical axis, because parallel plate 19 is tilted to the second optical axis by 45°. In this case, the reflected light beam is reflected in the plus direction of the X-axis.

Before a laser beam passes through parallel plate 17, the optical axis of the laser beam is the first optical axis. After the laser beam passes through parallel plate 17, the optical axis is shifted to the second optical axis. Consequently, the optical axis of a laser beam entering the upper surface of parallel plate 19 is shifted from intersection point P of the first optical axis (first rotary axis) and the upper surface of parallel plate 19 in the plus direction of the X-axis by shift amount A (=4.1 mm) of the second optical axis relative to the first optical axis.

With such shift, the optical axis of a reflected light beam that is actually reflected on the upper surface of parallel plate 19 is straight line x3 that is shifted from imaginary plane x1 that is extended through intersection point P in the plus direction of the X-axis by shift amount A described above (=4.1 mm) in the minus direction of the Z-axis.

Figure 9:
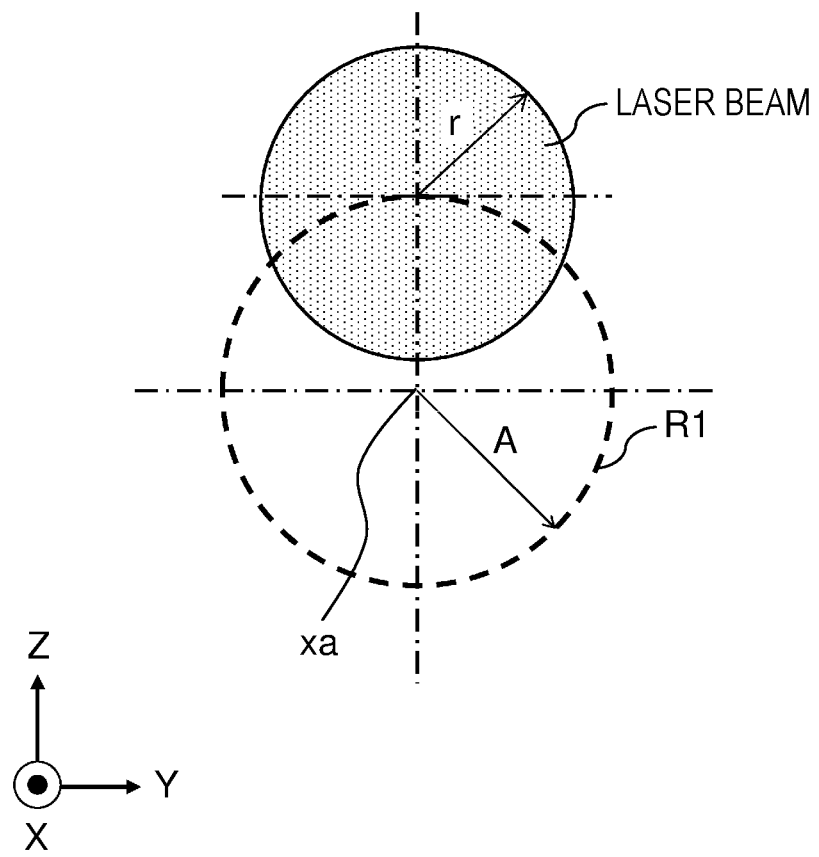
FIG. 9 illustrates a trace of reflected light when the angle formed by the two parallel plates changes.

FIG. 9 illustrates a trace of a reflected light beam when an angle formed by two parallel plates 17 and 19 changes.

Imaginary circle R1 of a broken line indicates a trace of an optical axis of a reflected light beam reflected by parallel plate 19. A central axis of imaginary circle R1 is line xa on imaginary plane x1 illustrated in FIG. 3. A radius of imaginary circle R1 is equal to shift amount A described above. A radius of a laser beam spot is denoted by r. The trace of a reflected light beam when the angle formed by two parallel plates 17 and 19 changes is a trace of a circle with radius r whose center moves on a circumference of circle R1.

As can be seen from the above description, if opening 7a in the side surface of holder 7 and light receiving part 6a in the side surface of body case 6 are respectively disposed to be closer to imaginary line xa than a position away from the central axis of circle R1 by sum (A+r) of shift amount A and radius r of a laser beam spot, a reflected light beam having passed through opening 7a is received by light receiving part 6a.

However, when a photodiode is used as light receiving part 6a, the photodiode usually has a few mm to a few dozen mm by a few mm to a few dozen mm square shape and a reflected light beam spot is usually less than or equal to 1 mm in size. Consequently, if light receiving part 6a is shifted from the optical axis of a reflected light beam by a few mm, the amount of light received by light receiving part 6a may significantly decrease.

Light receiving part 6a is preferably disposed at a position on the side surface of body case 6 where the optical axis of an actually reflected light beam passes, that is, a position shifted from central axis xa of circle R1 by shift amount A (on the circumference of circle R1 illustrated in FIG. 9).

In view of a decrease in the amount of light received due to oblique reflection on a surface of light receiving part 6a, the light receiving surface of light receiving part 6a is preferably orthogonal to the optical axis of a reflected light beam. For example, light receiving part 6a is more preferably disposed at a position shifted from intersection part P2 illustrated in FIG. 3 upward or downward (in the plus direction or the minus direction of the Z-axis direction) by shift amount A. For example, light receiving part 6a is more preferably disposed at position P4 illustrated in FIG. 3. This description is applicable to opening 7a. However, opening 7a can be set to be larger than light receiving part 6a in size, and thus is disposed less strictly than light receiving part 6a.

When a center of light receiving part 6a is placed at the position shifted upward or downward from intersection part P2 illustrated in FIG. 3 by shift amount A, the amount of light received by light receiving part 6a is maximized.

In the present exemplary embodiment, light receiving part 6a is preferably disposed in the side surface of body case 6 on a side where rotation mechanisms 31 and 32 are disposed. Servomotors 14 and 21 and wires connected to the encoders in servomotors 14 and 21 are disposed in this region. As wires connected to light receiving part 6a are arranged together with these wires, wiring is simplified. With reference to FIG. 2 for example, body case 6 is constituted by a left half portion (a minus portion in the X direction) and a right half portion (a plus portion in the X direction). These half portions are divided by an imaginary plane that passes through the central axis of body case 6 and is orthogonal to the X direction. Rotation mechanism 31 and 32 are disposed in the right half portion of body case 6. Light receiving part 6a is also disposed in the right half portion of body case 6.

Light receiving part 43a is also preferably disposed in the side surface of body case 6 on the side where rotation mechanisms 31 and 32 are disposed.

While opening 7a is a circular window and opening 8a is a slit in the present exemplary embodiment, openings 7a and 8a are not particularly limited to these shapes. The shape of openings 7a and 8a may be appropriately changed according to the size of light receiving parts 6a and 43a, the size of holder 7 and shield holder 8, the radius of a laser beam spot, or other factors.

The present exemplary embodiment has described the example in which parallel plates 17 and 19 are tilted 45° to the first rotary axis (or the second rotary axis). The tilt angle includes not only strict 45° but also 45° including assembly tolerances and processing tolerances in manufacturing.

Second Exemplary Embodiment

Laser processing device 100 described in the first exemplary embodiment is capable of diagnosing an output state of a laser beam, a state of rotation mechanisms 31 and 32, and the like based on light receiving signals from light receiving parts 6a and 43a included in laser processing head 50.

(Diagnosis of Laser Beam Output State)

Figure 10:
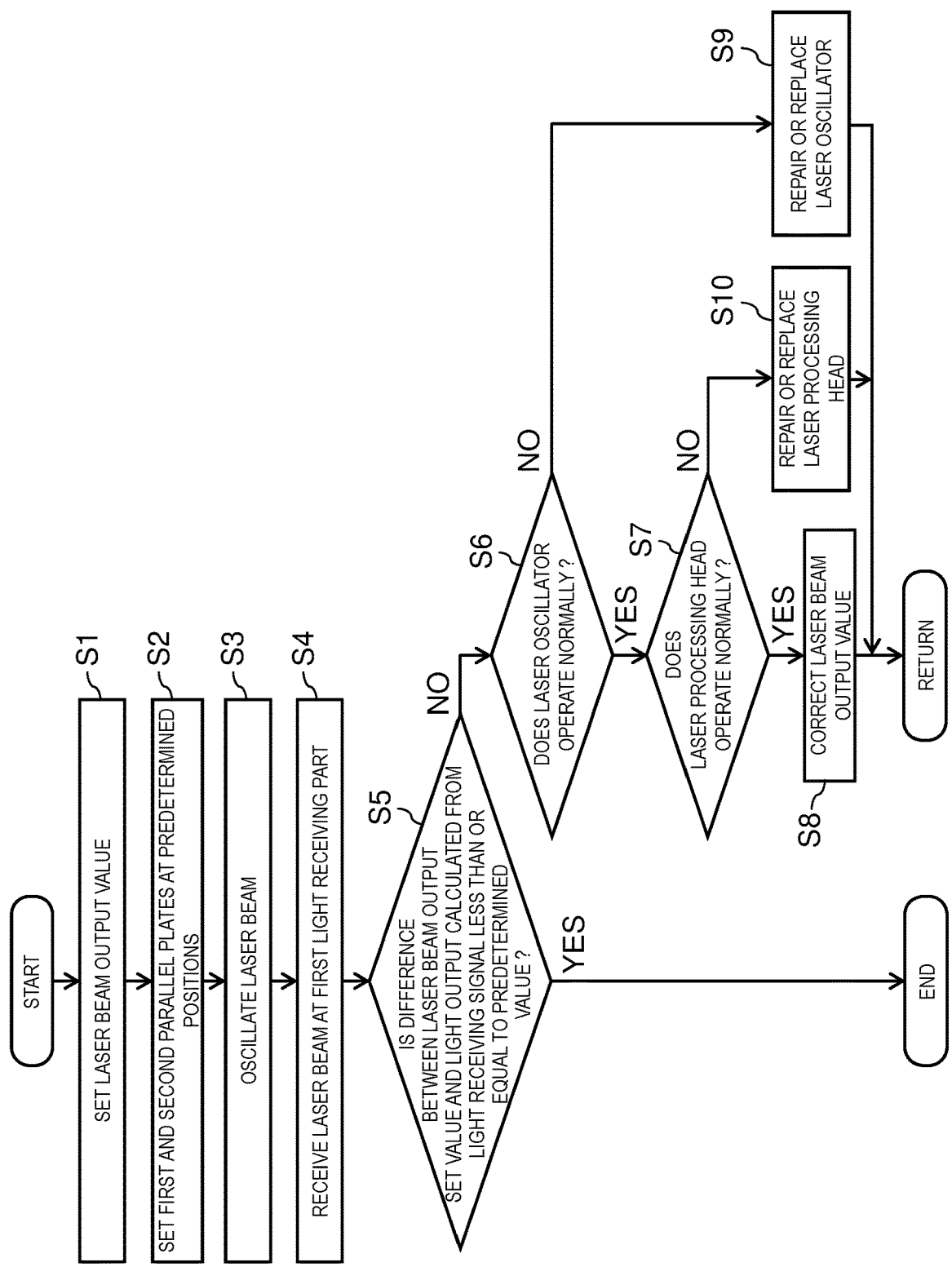
FIG. 10 is a flowchart of diagnosing a state of a laser beam output according to a second exemplary embodiment of the present disclosure.

FIG. 10 is a flowchart of diagnosing a laser beam output state according to the present exemplary embodiment.

Conditions required to process workpiece W, for example, a laser beam output value of laser oscillator 80 and other conditions are set first (step S1). The laser beam output value is set by inputting a control program for determining an output of laser oscillator 80 and a numerical value through input unit 75 illustrated in FIG. 7. The laser beam output set value is stored in storage unit 72 illustrated in FIG. 7.

Next, rotation mechanisms 31 and 32 are operated to adjust parallel plates 17 to 19 at predetermined positions (step S2). Such an arrangement is adjusted so as to maximize a light receiving signal in light receiving part 6a. In the present exemplary embodiment, parallel plates 17 and 19 are adjusted to be parallel to each other as viewed from the Y-axis direction, but the present invention is not particularly limited to this arrangement.

At step S2, by rotating rotation mechanism 31 in response to a rotation command signal from controller 71 illustrated in FIG. 7, holder 18 is rotated. As parallel plate 17 is fixed in holder 18, parallel plate 17 is also rotated around the first rotary axis together with rotation of holder 18. The rotation amount of servomotor 14 is adjusted to adjust a position of parallel plate 17. By rotating rotation mechanism 32, the parallel plate 19 is also positionally adjusted.

Laser oscillator 80 is operated to oscillate a laser beam (step S3), and the laser beam is introduced to laser processing head 50. The laser beam that has passed through parallel plate 17 and been reflected on an upper surface of parallel plate 19 is received by light receiving part 6a (step S4).

At step S3, a laser beam oscillates in response to an output command signal from light output controller 71a illustrated in FIG. 7, and the output command signal is also transmitted to storage unit 72 and stored in storage unit 72.

A light receiving signal output from light receiving part 6a is transmitted to robot control device 70, and it is determined whether a difference between light output maximum value PUmax calculated from the light receiving signal and the set value is less than or equal to a predetermined value. In the present exemplary embodiment, it is determined whether the difference is less than or equal to 2% (step S5).

If the difference described above is less than or equal to 2%, the laser beam output of laser oscillator 80 is determined to be normal, and the diagnosis ends.

At step S5, a light receiving signal output from light receiving part 6a is stored in storage unit 72, and then read from storage unit 72 into determination unit 73 illustrated in FIG. 7 together with a laser beam output set value included in an output command signal stored in storage unit 72, so that a determination is made.

If the difference described above exceeds 2%, laser oscillator 80 is inspected to determine whether laser oscillator 80 operates normally (step S6), and then laser processing head 50 is inspected to determine whether laser processing head 50 operates normally (step S7).

If laser oscillator 80 and laser processing head 50 operate normally, laser beam output setting is corrected (step S8), and then the process returns to step S1 and a laser beam output is diagnosed again.

Even if a decrease in the performance of laser oscillator 80 and laser processing head 50 is found or laser oscillator 80 and laser processing head 50 are internally contaminated at step S8, as long as conditions for starting maintenance of the devices, which are separately specified, are satisfied, these devices are determined to be normal.

At step S8, a correction is performed on the laser beam output value in processing. Consequently, it is possible to obtain a desired laser output without replacing laser oscillator 80 and laser processing head 50. Data required for correction is obtained in advance and stored in storage unit 72, for example. The data is read from storage unit 72 at the time of the correction for the purpose of changing parameters in a laser processing control program, so that the laser beam output is corrected.

If an abnormality is found in laser oscillator 80, laser oscillation stops and laser processing device 100 also stops. Laser oscillator 80 is repaired or replaced (step S9) and then a laser beam output is diagnosed again.

If laser oscillator 80 operates normally but an abnormality is found in laser processing head 50, laser oscillation stops and laser processing device 100 also stops. Laser processing head 50 is repaired or replaced (step S10) and then a laser beam output is diagnosed again.

In both cases, if the difference between a light beam output measured and a set value is eventually less than or equal to 2%, the laser beam output is determined to be normal, and the diagnosis ends.

An order of step S6 and step S7 may be reversed, or an order of step S9 and step S10 may be reversed.

Figure 11:
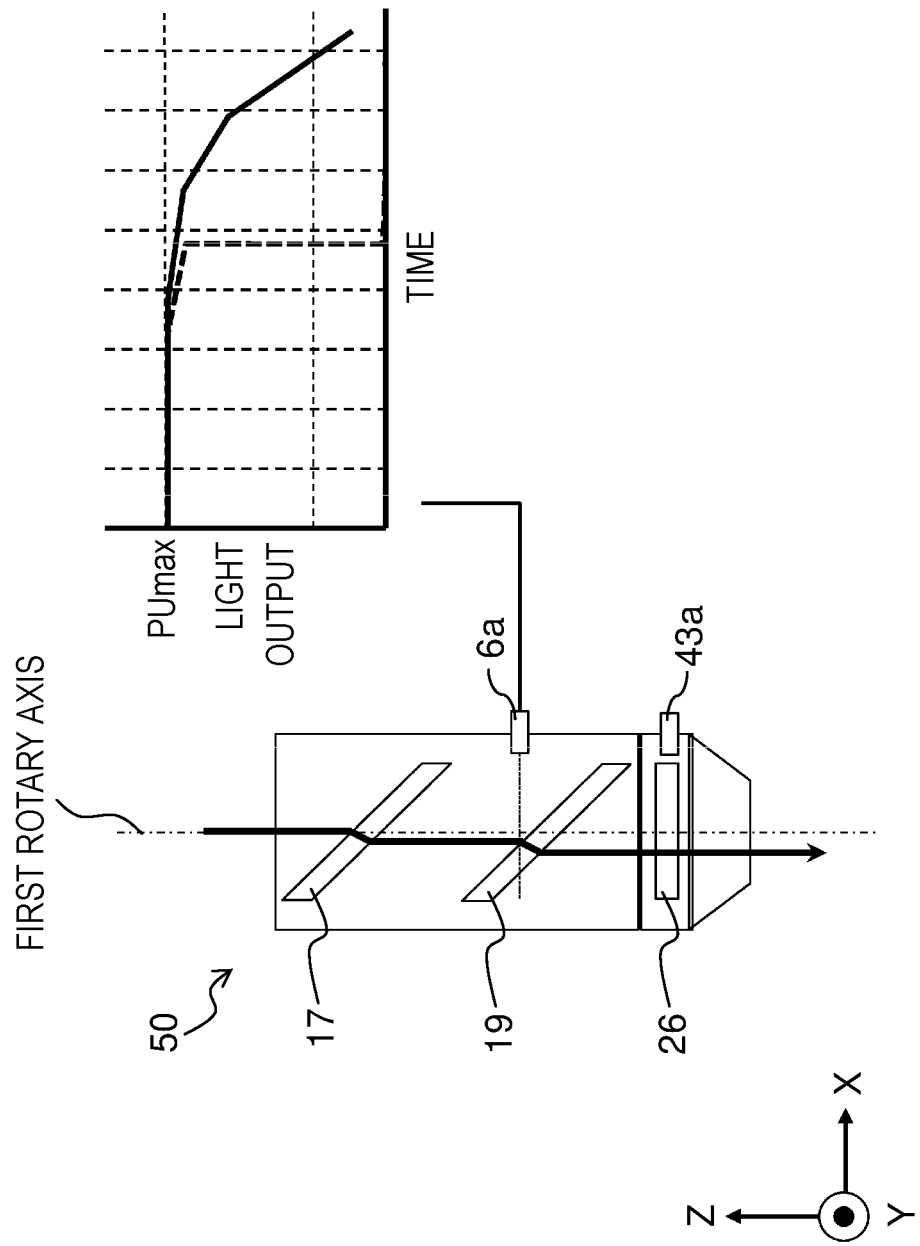
FIG. 11 illustrates a temporal change in light intensity calculated based on an output signal from a first light receiving part when a first parallel plate and a second parallel plate are adjusted at predetermined positions.

FIG. 11 illustrates a temporal change in a light output calculated from an output signal from first light receiving part 6a when parallel plates 17 and 19 are adjusted at predetermined positions.

As indicated by a solid line in the graph of FIG. 11, while laser processing device 100 is used for a long time, the light output tends to decrease at a certain point of time. This is because of degradation of laser oscillator 80 and laser processing head 50 over time. If an optical system in laser oscillator 80 is broken, laser is not oscillated. For this reason, as indicated by a broken line in the graph of FIG. 11, the light output suddenly becomes less than or equal to a detection limit.

While whether the laser beam output state is normal is diagnosed by determining whether the difference between a laser beam output measured and a set value is less than or equal to 2% in the present exemplary embodiment, the value 2% is only an example. The value may be appropriately changed depending on size and sensitivity of a light receiving element in light receiving part 6a, a position of light receiving part 6a in body case 6, and other factors.

(Diagnosis of State of Protection Glass)

Figure 12:
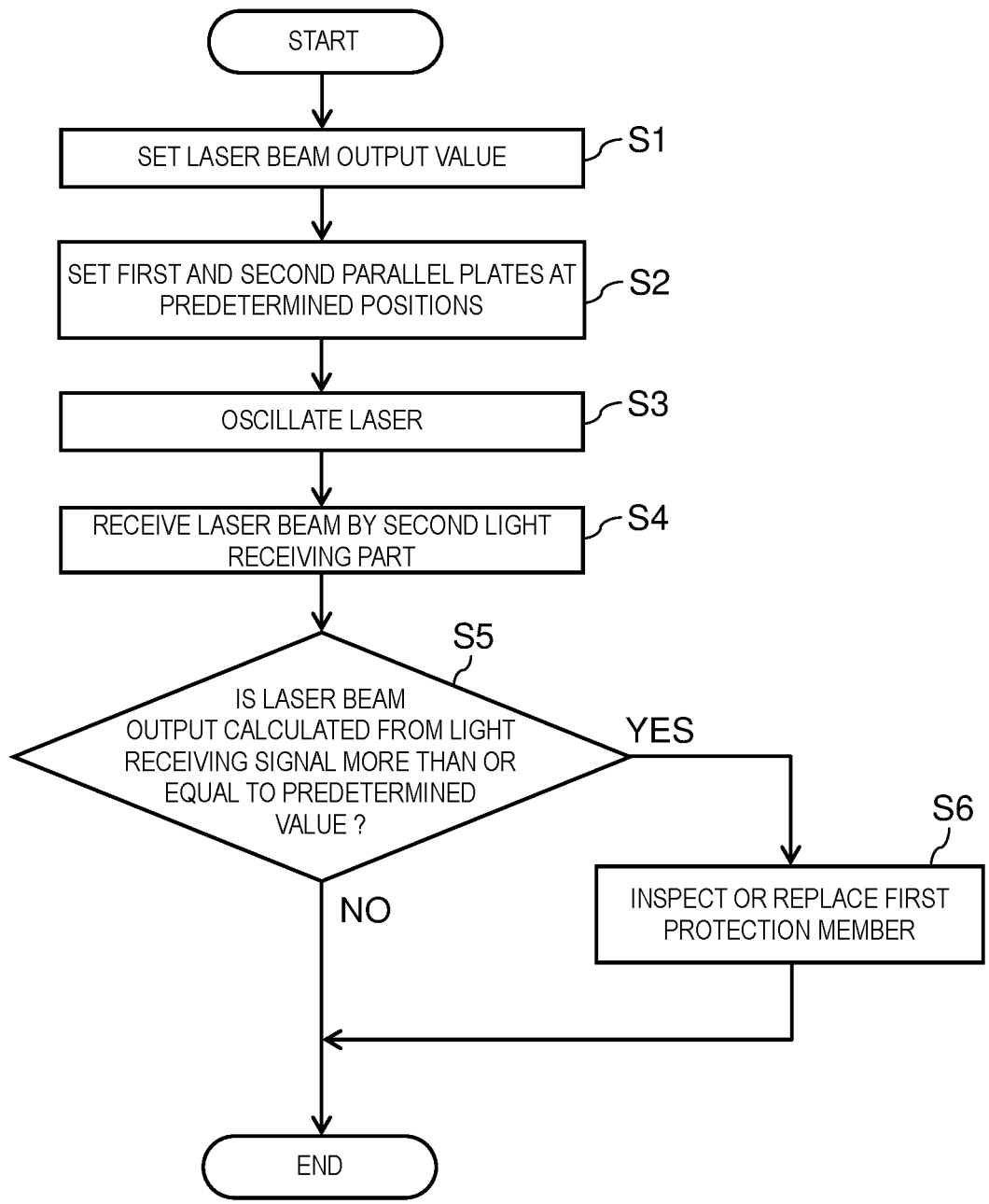
FIG. 12 is a flowchart of diagnosing a state of a protection glass included in a laser processing head.

FIG. 12 is a flowchart of diagnosing a state of protection glass 26 included in laser processing head 50.

Conditions required to process workpiece W, for example, a laser beam output value of laser oscillator 80 and other conditions are set first (step S1). The method of setting and storing the laser beam output value is similar to that at step S1 illustrated in FIG. 10.

Next, rotation mechanisms 31 and 32 are operated to adjust parallel plates 17 to 19 at predetermined positions (step S2). Conditions for adjusting the positions of parallel plates 17 and 19 are similar to those at step S2 illustrated in FIG. 10.

Laser oscillator 80 is operated to oscillate a laser beam (step S3), and the laser beam is introduced to laser processing head 50. Among laser beams that have passed through parallel plates 17 and 19 and protection glass 25 to enter protection glass 26, a laser beam that travels through protection glass 26 and passes through opening 8a is received by light receiving part 43a (step S4).

A light receiving signal generated by light receiving part 43a is transmitted to robot control device 70, and it is determined whether the laser beam output calculated from the light receiving signal is more than or equal to a predetermined value (step S5). In the present exemplary embodiment, if no abnormality is found in protection glass 26, the laser beam output calculated from the light receiving signal generated by light receiving part 43a is stored in storage unit 72 illustrated in FIG. 7, a ratio of the laser beam output value (hereinafter, referred to as "normal value") and a measurement value is calculated to determine the predetermined value.

In the present exemplary embodiment, if the measurement value is less than three times as large as the normal value, it is determined that no abnormality is found in protection glass 26 and the diagnosis ends.

If the measurement value is three times or more as large as the normal value, laser oscillation stops and laser processing device 100 also stops. Shield holder 8 is taken out of laser processing head 50 and then protection glass 26 is inspected. A surface of protection glass 26 is cleaned or protection glass 26 is taken out of shield holder 8 and replaced by a new protection glass (step S6), and then the diagnosis ends. Determination unit 73 is capable of determining a time when a protection glass is replaced.

Whether there is an abnormality in protection glass 26 is determined by determining whether the ratio of the measurement value to the normal value is three or more in the present exemplary embodiment. However, the ratio is only an example. The ratio may be appropriately changed depending on a material of workpiece W, processing conditions, and other factors.

The operations at steps S1 to S5 and the diagnosis are performed by the functional blocks illustrated in FIG. 7, as in the diagnosis of the laser beam output state. Step S2 may be omitted.

Figure 13:
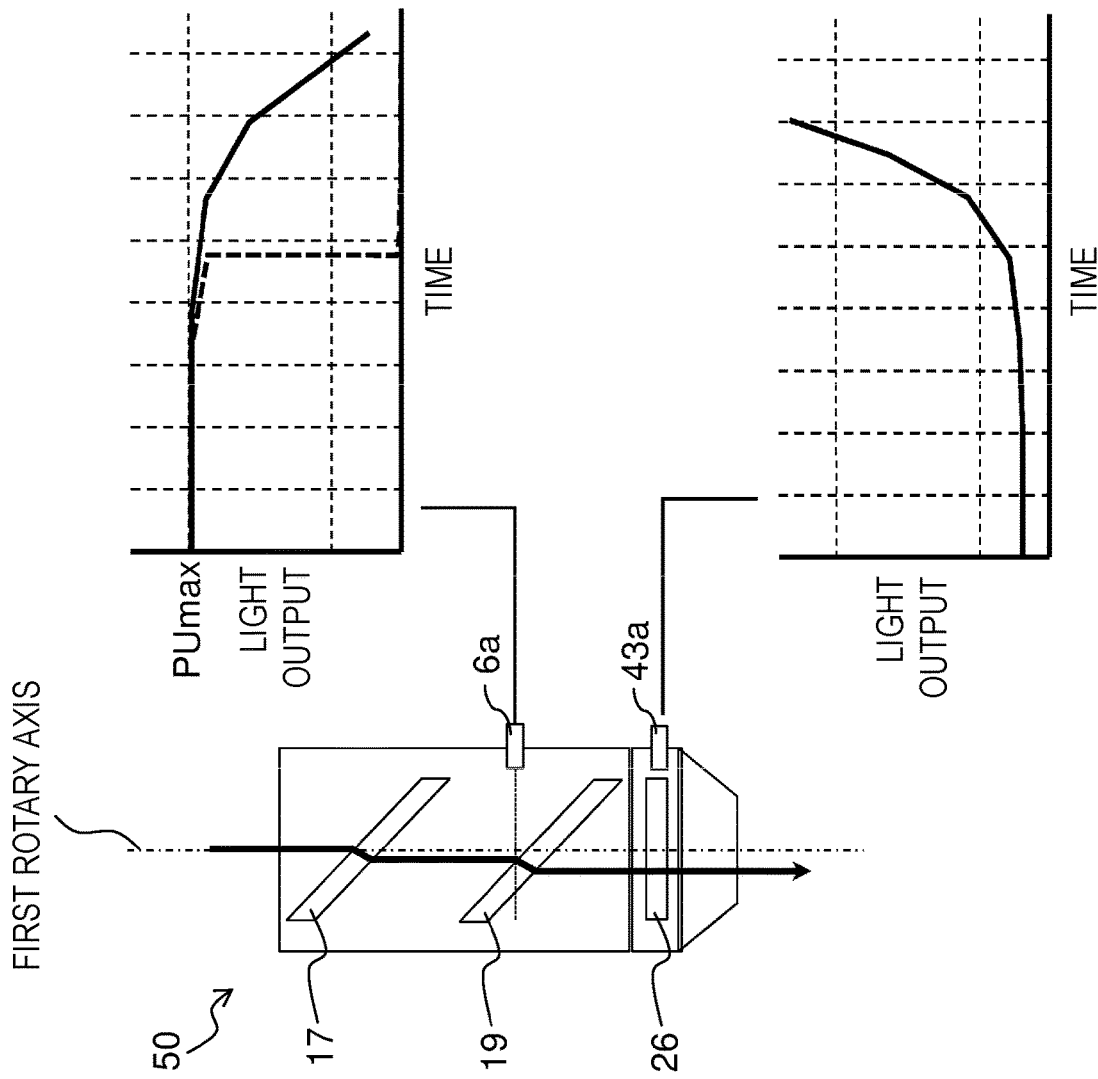
FIG. 13 illustrates a temporal change in light intensity calculated based on output signals from first light receiving part and second light receiving part when the first parallel plate and the second parallel plate are adjusted at predetermined positions.

FIG. 13 illustrates a temporal change in a light output calculated from output signals from light receiving parts 6a and 43a when parallel plates 17 and 19 are adjusted at predetermined positions.

As illustrated in a bottom graph of FIG. 13, while laser processing device 100 is used for a long time, the light output detected by light receiving part 43a tends to increase over time. This is because a surface of protection glass 26 that opposes workpiece W becomes dirty with fumes and sputters from workpiece W during laser processing, and the amount of light reflected from the surface to the inside of laser processing head 50 increases according to a processing amount. Air is blown onto protection glass 26 so as to prevent fumes from adhering to protection glass 26 during processing in an actual device, but the surface of protection glass 26 inevitably becomes dirty according to the processing amount. Consequently, it is necessary to diagnose the state of protection glass 26.

According to the present exemplary embodiment, the state of the protection glass is preferably diagnosed with relatively short frequency. As the surface of protection glass 26 becomes dirty every laser processing, the state of protection glass 26 may be diagnosed every processing, for example. This frequency is appropriately determined by a time during which a laser beam is output to workpiece W in laser processing, a laser beam output value, a material of workpiece W, and other factors.

The laser beam output state and the state of the protection glass may be diagnosed simultaneously. However, frequencies of diagnoses of these states are different and thus the diagnoses need not to be performed simultaneously.

In FIG. 13, a time axis of the top graph is different from a time axis of the bottom graph.

The frequency of the diagnosis of a laser beam output state depends on conditions for outputting laser beams, but is determined by a replacement period of laser oscillator 80 or laser processing head 50. The frequency of the diagnosis of a laser beam output state is much lower than the frequency of the diagnosis of the state of protection glass 26. For example, the laser beam output state is diagnosed every hundred to a few hundred processing operations.

Figure 14:
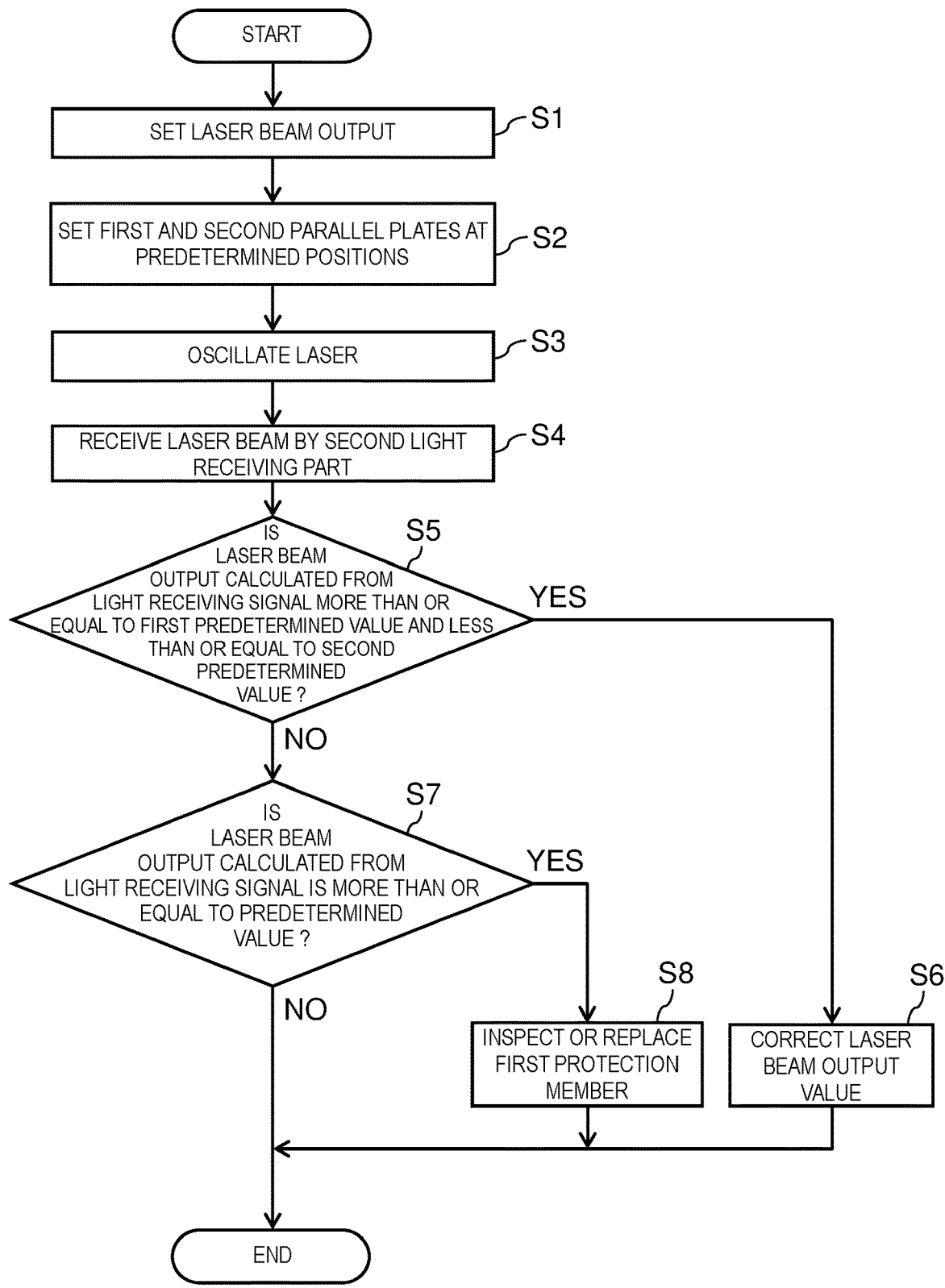
FIG. 14 is another flowchart of diagnosing the state of the protection glass included in the laser processing head.

As illustrated in FIG. 14, two predetermined values may be set as the predetermined value described above. For example, a first predetermined value is set to be three times as large as the normal value, and a second predetermined value is set to be ten times as large as the normal value.

In this case, if a measurement value is between three times and ten times (inclusive) as large as the normal value at step S5, a light beam output value in processing is corrected (step S6) and the diagnosis ends.

As described above, the state of the surface of protection glass 26 changes depending on a processing time and a laser beam output at that time. In the flowchart of the state diagnosis illustrated in FIG. 12, if no measure is taken before it is determined to be time to replace protection glass 26, the difference between a light beam output set value included in an output command to laser oscillator 80 and a laser beam output that is actually irradiated onto workpiece W increases, which may lead to a processing defect.

In such a case, by correcting the light beam output value in processing, the processing defect is avoided without reducing the replacement period of protection glass 26. Data required for correction is obtained in advance and stored in storage unit 72, for example. The data is read from storage unit 72 at the time of the correction for the purpose of changing parameters in a laser processing control program, so that the light beam output is corrected.

As described above, according to the present exemplary embodiment, a laser beam reflected by parallel plate 19 is received by light receiving part 6a disposed in the head. As a result, the output state of the laser beam is diagnosed, it is determined whether there is an abnormality in laser oscillator 80 and laser processing head 50 based on diagnosis results, and repairs are made. It is thus possible to avoid a processing defect in laser processing.

A laser beam that travels through protection glass 26 disposed at the distal end of laser processing head 50 is received by light receiving part 8a disposed in the head. As a result, the state of protection glass 26 is diagnosed, it is determined whether there is an abnormality in protection glass 26 based on diagnosis results, and protection glass 26 is replaced. It is thus possible to avoid a processing defect in laser processing.

Third Exemplary Embodiment (Diagnosis of Rotation Mechanism)

Figure 15:
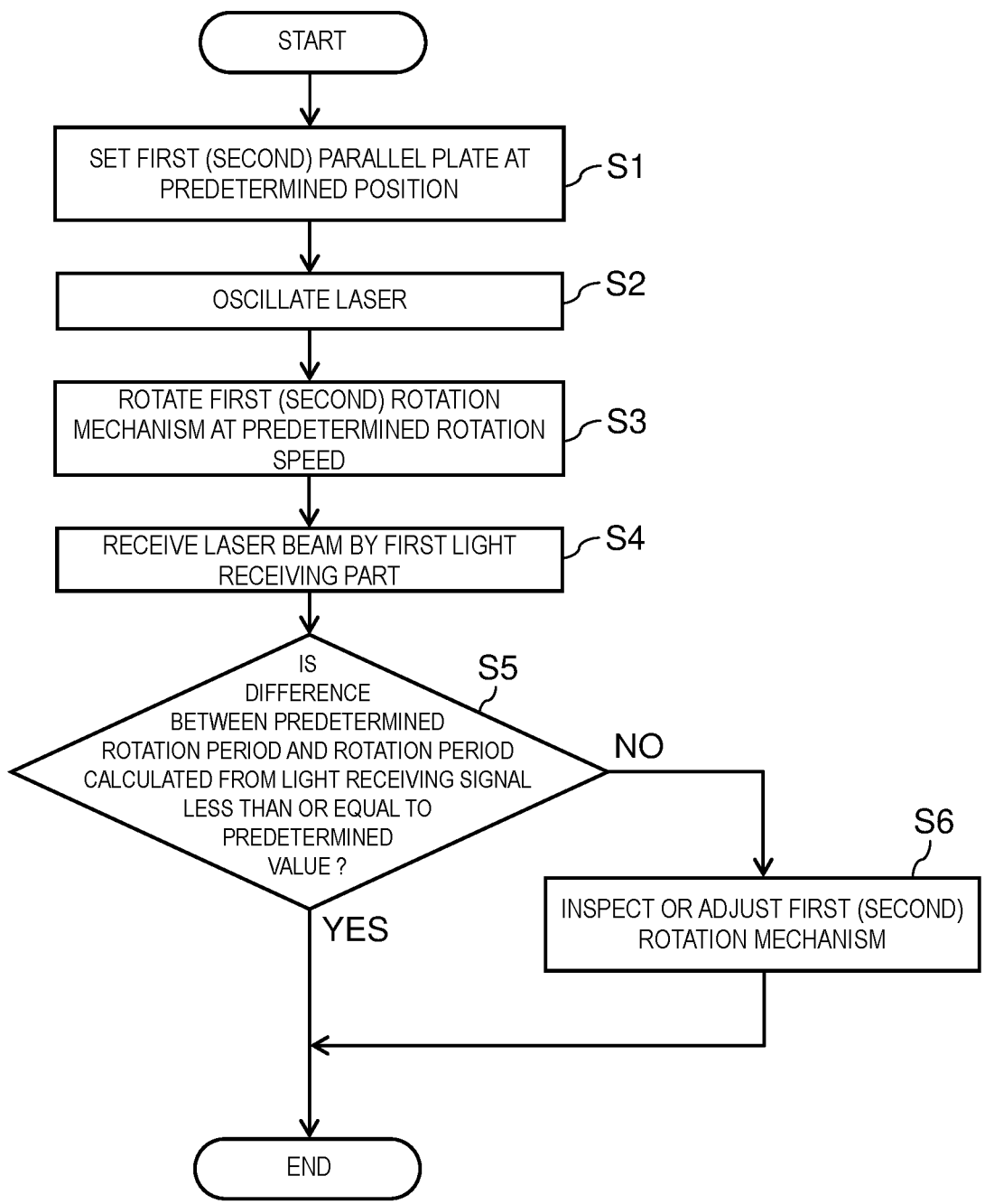
FIG. 15 is a flowchart of diagnosing a rotation mechanism according to a third exemplary embodiment of the present disclosure.

FIG. 15 is a flowchart of diagnosing a rotation mechanism according to the present exemplary embodiment.

Rotation mechanisms 31 and 32 are operated to adjust parallel plates 17 to 19 at predetermined positions (step S1). Conditions for adjusting positions of parallel plates 17 and 19 are similar to those at step S2 illustrated in FIG. 10.

Laser oscillator 80 is operated to oscillate a laser beam (step S2), and the laser beam is introduced to laser processing head 50. Rotation mechanism 31 is rotated at rotation speed $\theta 1$ while rotation mechanism 32 is fixed (step S3), and a laser beam reflected on an upper surface of parallel plate 19 is received by light receiving part 6a (step S4).

A light receiving signal generated by light receiving part 6a is transmitted to robot control device 70. Actual rotation period TU of rotation mechanism 31 is then calculated from a temporal change in the maximum value of a light output calculated from the light receiving signal. It is then determined whether a difference between rotation period TU and a rotation period that is set in advance and based on a rotation speed is less than or equal to a predetermined value. In the present exemplary embodiment, it is determined whether the difference is less than or equal to 3% (step S5).

If the difference is less than or equal to 3%, it is determined that no abnormality is found in rotation mechanism 31 and the diagnosis ends.

If the difference described above exceeds 3%, laser processing device 100 stops. Rotation mechanism 31 is inspected and repaired or replaced if necessary (step S6), and a laser beam output is measured again to calculate the rotation period.

If the difference between rotation period TU measured and the rotation period set in advance is eventually less than or equal to 3%, rotation mechanism 31 is determined to be normal, and the diagnosis ends.

The operations at steps S1 to S5 and the diagnosis are performed by the functional blocks illustrated in FIG. 7, as in the diagnosis of the laser beam output state. While rotation mechanism 31 is rotated in response to a rotation command signal from controller 71 at step S3, the rotation command signal also contains rotation speed $\theta 1$. The rotation command signal is also transmitted to storage unit 72 and stored in storage unit 72.

Whether there is an abnormality in rotation mechanism 31 is determined by determining whether the difference between rotation period TU measured and the rotation period set in advance is less than or equal to 3% in the present exemplary embodiment. However, this value is only an example. The value may be appropriately changed depending on the size of holders 7 and 18, the rotation speed of rotation mechanism 31, and other factors.

At step S3, rotation mechanism 32 may be rotated at rotation speed $\theta 2$ while rotation mechanism 31 is fixed, so that the state of rotation mechanism 32 may be diagnosed.

Alternatively, after the state of rotation mechanism 31 is diagnosed, the state of rotation mechanism 32 may be successively diagnosed.

In servomotor 14 of rotation mechanism 31 and servomotor 21 of rotation mechanism 32, a user can grasp whether each servomotor is normal, in this case, whether each of servomotors 14 and 21 operates as commanded by controller 71, using a feedback signal from an encoder (not illustrated) connected to each servomotor.

For this reason, in the diagnosis flow of the present exemplary embodiment, the state of timing belts 15 and 22 is mainly diagnosed. During the operation of rotation mechanisms 31 and 32, timing belts 15 and 22 respectively contact timing pulleys 16 and 20 and receive friction, and thus are most easily worn or broken among components constituting rotation mechanisms 31 and 32. If timing belts 15 and 22 are broken, rotating force of servomotors 14 and 21 are not transmitted to holders 18 and 7, respectively. As a result, it is impossible to control a laser beam position. For example, trepanning of a predetermined shape is impossible. Consequently, it is important for laser processing to monitor the state of timing belts 15 and 22 and determine a replacement period of these timing belts.

According to the present exemplary embodiment, the state of the rotation mechanism is preferably diagnosed with relatively short frequency. For example, the state diagnosis may be performed every few dozen to hundred processing operations. This frequency may be appropriately changed depending on a total rotation amount of rotation mechanisms 31 and 32 in each laser processing process, diameter and material of timing belts 15 and 22, ambient temperature environment of laser processing head 50, and other factors.

According to the present exemplary embodiment, the state of rotation mechanisms 31 and 32 is easily diagnosed and a processing defect in laser processing is avoided. In particular, as it is possible to diagnose whether there is an abnormality in timing belts 15 and 22, the replacement period of these timing belts can be determined accurately.

The diagnosis of the state of the rotation mechanism according to the present exemplary embodiment may be performed in combination with other state diagnoses according to the second exemplary embodiment.

Figure 16:
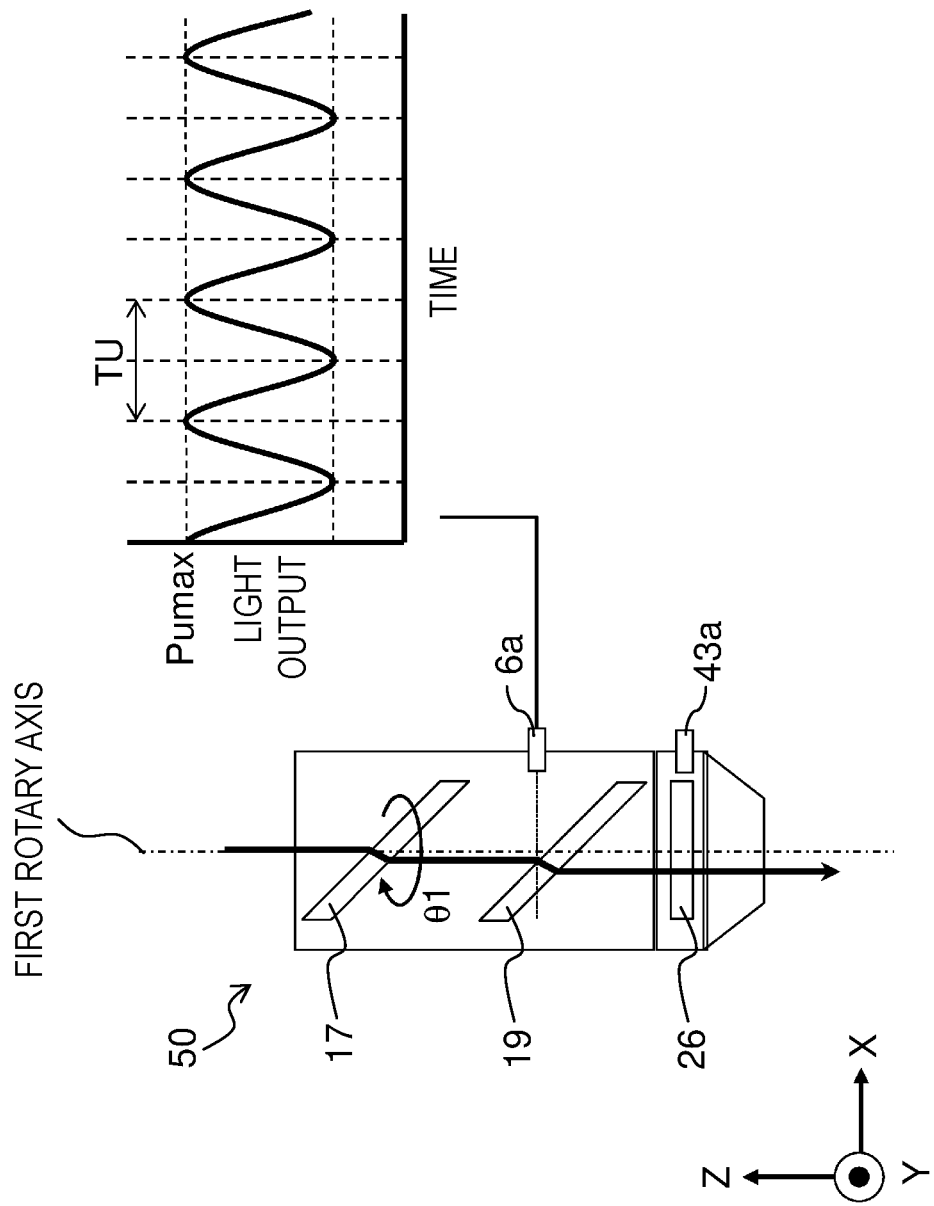
FIG. 16 illustrates a temporal change in light intensity calculated based on an output signal from a first light receiving part when a first rotation mechanism rotates.
Figure 17:
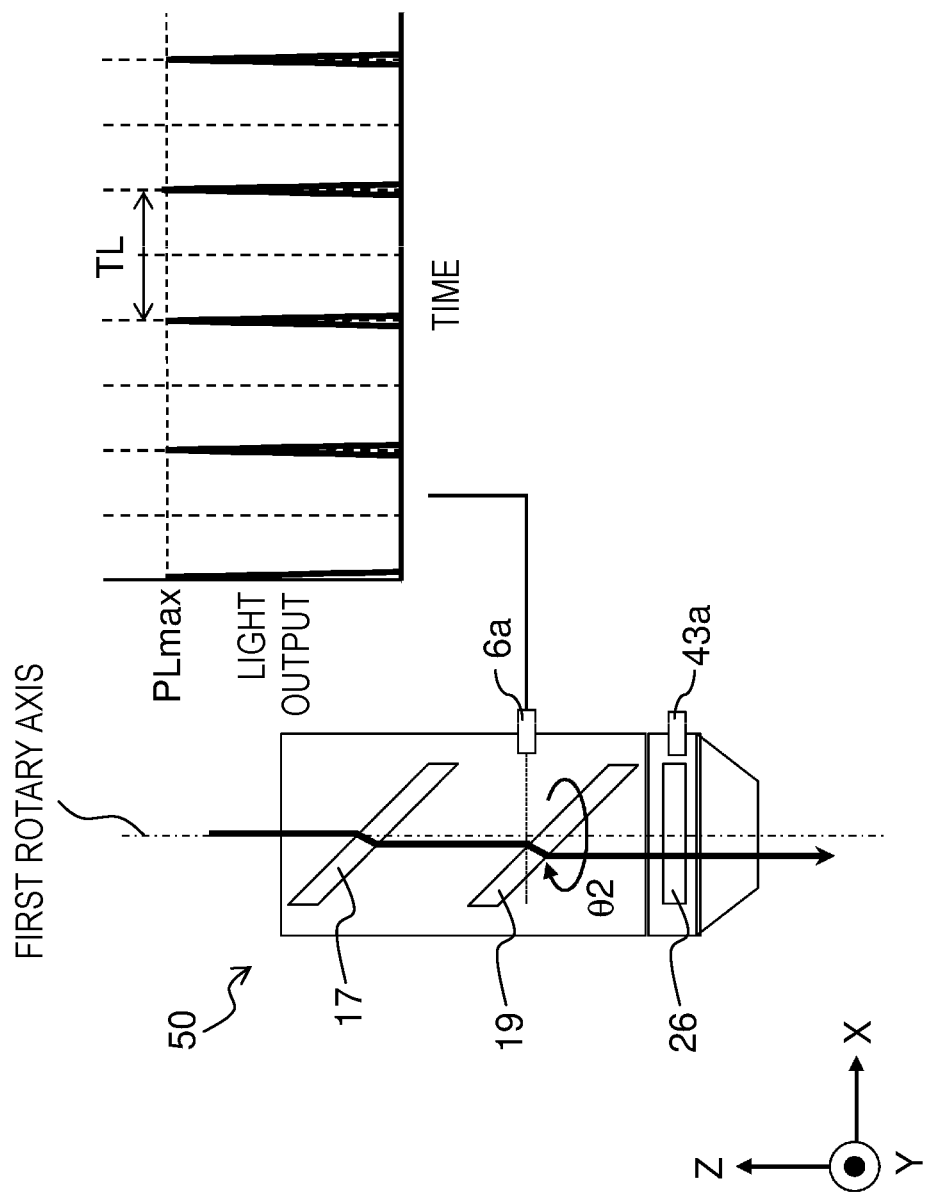
FIG. 17 illustrates a temporal change in light intensity calculated based on an output signal from the first light receiving part when a second rotation mechanism rotates.

FIG. 16 illustrates a temporal change in a light output calculated from an output signal from light receiving part 6a when rotation mechanism 31 is rotated. FIG. 17 illustrates a temporal change in a light output calculated from an output signal from light receiving part 6a when rotation mechanism 32 is rotated.

In the state diagnosis flow illustrated in FIG. 15, parallel plate 19 is fixed at a position where the amount of light received in light receiving part 6a is maximized at step S1. For this reason, if parallel plate 17 rotates around a first rotary axis and the angle formed by parallel plates 17 and 19 changes with time at step S3, the amount of light that is more than or equal to a certain amount is received in light receiving part 6a and high signal intensity is achieved. As illustrated in FIG. 16, a half width of a light output is large and thus the maximum value is easily calculated. For example, the diagnosis of a laser beam output state according to the second exemplary embodiment may be performed in combination with the diagnosis of the state of rotation mechanism 31 according to the present exemplary embodiment.

Meanwhile, when rotation mechanism 32 is rotated, holder 7 is also rotated. The position of opening 7a is changed accordingly. In the present exemplary embodiment, a light receiving signal is generated in light receiving part 6a only when an incident point of a laser beam on the upper surface of parallel plate 19, opening 7a, and light receiving part 6a are aligned in this order in the X-axis direction.

As illustrated in FIG. 17, the half width of a light output is significantly less than that of FIG. 16. Rotation period TL of rotation mechanism 32 can be calculated from a temporal change in a light receiving signal, but an accurate value of the light output is difficult to be calculated. Consequently, it is more preferable to perform the diagnosis of the rotation state of rotation mechanism 31 illustrated in FIG. 16 in combination with the diagnosis of a laser beam output state.

Alternatively, the diagnosis of the state of a protection glass according to the second exemplary embodiment may be performed in combination with the diagnosis of the state of one or both of rotation mechanisms 31 and 32 according to the present exemplary embodiment.

In this case, the amount of light received in light receiving part 43a does not depend on the rotation of parallel plates 17 and 19. Consequently, when the diagnosis of the state of rotation mechanism 31 or 32 is performed, or the diagnosis of the state of rotation mechanism 31 and the diagnosis of the state of rotation mechanism 32 are successively performed, the state of protection glass 26 may be diagnosed in combination such diagnoses.

INDUSTRIAL APPLICABILITY

The laser processing head according to an aspect of the present disclosure is capable of diagnosing components of the head based on a signal from a light receiving part disposed in the head and thus is useful for application to a laser processing device.

REFERENCE MARKS IN THE DRAWINGS

4: collimation lens
5: focusing lens
6: body case (first case)
6a: light receiving part (first light receiving part)
7: holder (second holder)
7a: opening (first light transmission part)
7b: light transmission member
8: shield holder (third holder)
8a: opening (second light transmission part)
8b: light transmission member
17: parallel plate (first parallel plate)
18: holder (first holder)
19: parallel plate (second parallel plate)
26: protection glass (first protection member)
31: rotation mechanism (first rotation mechanism)
32: rotation mechanism (second rotation mechanism)
43: nozzle unit (second case)
43a: light receiving part (second light receiving part)
50: laser processing head
60: manipulator
70: robot control device
71: controller
72: storage unit
73: determination unit (calculation unit)
74: display unit
75: input unit
80: laser oscillator
100: laser processing device

The invention claimed is:

1. A laser processing head comprising:
a first parallel plate that shifts an optical axis of a laser beam from a first optical axis to a second optical axis;
a first holder that holds the first parallel plate;
a first rotation mechanism that rotates the first holder around a first rotary axis;
a second parallel plate that shifts the optical axis of the laser beam that has been shifted to the second optical axis by the first parallel plate to a third optical axis;
a second holder that holds the second parallel plate;
a second rotation mechanism that rotates the second holder around a second rotary axis; and
a first case that accommodates the first parallel plate, the first holder, the second parallel plate, and the second holder,
wherein
the first rotary axis, the second rotary axis, and the first optical axis are aligned with each other,
the laser beam passes through the first case from upward to downward,
a first light transmission part that the laser beam having been shifted by the first parallel plate and reflected by an incident surface of the second parallel plate passes through is formed in the second holder, and
a first light receiving part that receives the laser beam having passed through the first light transmission part is disposed in the first case.

2. The laser processing head according to claim 1, wherein the first case includes an intersection part P2 where a plane x1 that passes an intersection point P of an incident surface of the laser beam on the second parallel plate to the first rotary axis and extends in a direction orthogonal to the first rotary axis intersects a side surface of the first case, and the first light receiving part is disposed at a position that is shifted upward or downward from the intersection part P2 of the first case by a shift amount A between the first optical axis and the second optical axis according to rotation of the first parallel plate.

3. The laser processing head according to claim 2, wherein a center of the first light receiving part is placed at a position that is shifted upward or downward from the intersection part P2 by the shift amount A.

4. The laser processing head according to claim 1, further comprising:
a second case disposed at an end portion of the first case on an emission side of the laser beam emission side;
a third holder that is detachably attached to the second case; and
a first protection member that is held by the third holder and is capable of transmitting the laser beam whose optical axis has been shifted to the third optical axis,
wherein
the third holder includes a second light transmission part at a predetermined position opposing a side surface of the first protection member, and
the second case includes a second light receiving part that receives the laser beam having traveled through the first protection member at a position opposing the second light transmission part.

5. The laser processing head according to claim 4, wherein one or both of the first light transmission part and the second light transmission part are closed by a light transmission member that transmits the laser beam.

6. The laser processing head according to claim 4, wherein the first light receiving part and the second light receiving part are respectively disposed in the first case and the second case on a side where the first rotation mechanism and the second rotation mechanism are disposed.

7. A laser processing device comprising:
a laser oscillator that emits a laser beam having a first optical axis;
a first parallel plate that shifts an optical axis of the laser beam from the first optical axis to a second optical axis;
a first holder that holds the first parallel plate;
a first rotation mechanism that rotates the first holder around a first rotary axis;
a second parallel plate that shifts the optical axis of the laser beam that has been shifted to the second optical axis by the first parallel plate to a third optical axis;
a second holder that holds the second parallel plate;
a second rotation mechanism that rotates the second holder around a second rotary axis; and
a first case that accommodates the first parallel plate, the first holder, the second parallel plate, and the second holder,
wherein
the first rotary axis, the second rotary axis, and the first optical axis are aligned with each other,
the laser beam passes through the first case from upward to downward,
a first light transmission part that the laser beam having been shifted by the first parallel plate and reflected by an incident surface of the second parallel plate passes through is formed in the second holder, and
a first light receiving part that receives the laser beam having passes through the first light transmission part is disposed in the first case
wherein
the laser processing head that emits the laser beam to a workpiece; and
a control device that controls laser oscillation of the laser oscillator and a movement of the laser processing head.

8. The laser processing device according to claim 7, wherein the control device at least includes
a controller that transmits an output command signal to the laser oscillator to cause the laser oscillator to oscillate laser,
a storage unit that stores the output command signal and a light receiving signal output from the first light receiving part,
a determination unit that determines whether the laser beam output is normal, based on the output command signal and the light receiving signal, and
a display unit that displays a result determined by the determination unit.

9. The laser processing device according to claim 8, wherein
the controller is configured to transmit a rotation command signal to the first rotation mechanism or the second rotation mechanism to rotate the first holder or the second holder at a predetermined rotation speed,
the storage unit is configured to store the rotation command signal, and
the determination unit is configured to determine whether the first rotation mechanism or the second rotation mechanism operates normally based on a rotation period included in the rotation command signal and a variation period of a light receiving signal output from the first light receiving part.

10. The laser processing device according to claim 8, wherein
the laser processing head comprising:
a second case disposed at an end portion of the first case on an emission side of the laser beam;
a third holder that is detachably attached to the case; and
a first protection member that is held by the third holder and is capable of transmitting the laser beam whose optical axis has been shifted to the third optical axis,
wherein
the third holder includes a second light transmission part at a predetermined position opposing a side surface of the first protection member, and
the second case includes a second light receiving part that receives the laser beam having traveled through the first protection member at a position opposing the second light transmission part,
wherein
the determination unit is configured to determine a replacement period of the first protection member, based on a light receiving signal output from the second light receiving part.

* * * * *